US012769610B2

(12) United States Patent
Baek et al.

(10) Patent No.: US 12,769,610 B2
(45) Date of Patent: Oct. 20, 2026

(54) CONTROLLER INCLUDING FAULT MANAGEMENT DEVICE WITH MAPPING CONTROL CIRCUIT AND FAULT MANAGEMENT METHOD

(71) Applicant: SK hynix Inc., Icheon-si (KR)

(72) Inventors: Seung Min Baek, San Jose, CA (US); Hoiju Chung, San Jose, CA (US); Eui Sang Oh, San Jose, CA (US); Woong Ju Jang, San Jose, CA (US)

(73) Assignee: SK hynix Inc., Icheon-si (KR)

( * ) Notice: Subject to any disclaimer, the term of this patent is extended or adjusted under 35 U.S.C. 154(b) by 0 days.

(21) Appl. No.: 18/975,972

(22) Filed: Dec. 10, 2024

(65) Prior Publication Data

US 2026/0037367 A1 Feb. 5, 2026

Related U.S. Application Data

(60) Provisional application No. 63/678,281, filed on Aug. 1, 2024.

(51) Int. Cl.

*G06F 11/00* (2006.01)
*G06F 11/07* (2006.01)

(52) U.S. Cl.

CPC ...... *G06F 11/0793* (2013.01); *G06F 11/0727* (2013.01)

(58) Field of Classification Search

None

See application file for complete search history.

(56) References Cited

U.S. PATENT DOCUMENTS

| | | | | |
|---|---|---|---|---|
| 8,879,295 | B1 | 11/2014 | Barth, Jr. et al. | |
| 2004/0208070 | A1* | 10/2004 | Nagata | G11C 29/4401 365/201 |
| 2016/0239379 | A1* | 8/2016 | Fee | G06F 11/0727 |
| 2021/0124659 | A1* | 4/2021 | Ryu | G11C 17/18 |
| 2024/0419531 | A1* | 12/2024 | Park | G11C 29/76 |
| 2025/0061055 | A1* | 2/2025 | Sehgal | G11C 29/4401 |

OTHER PUBLICATIONS

NPL Scholar/Patents search—text refined (Year: 2026).*
Google Scholar/Patents search—text refined (Year: 2026).*

* cited by examiner

*Primary Examiner* — Christopher S Mccarthy

(57) ABSTRACT

A fault management device includes a first storage circuit configured to receive and sequentially store a fault address of a memory device and to output a selection signal by comparing stored fault addresses with an input address; a second storage circuit configured to store repair addresses corresponding to the stored fault addresses to output a selected repair address corresponding to the selection signal; and a mapping control circuit configured to control the first storage circuit to mask one or more bits of the received fault address according to a mode information signal indicating faults in two or more sub-word lines, among a plurality of sub-word lines arranged in the memory device, and to control the second storage circuit to mask one or more bits of a repair address corresponding to the masked bits of the received fault address.

21 Claims, 24 Drawing Sheets

CONTROLLER INCLUDING FAULT MANAGEMENT DEVICE WITH MAPPING CONTROL CIRCUIT AND FAULT MANAGEMENT METHOD

CROSS-REFERENCE TO RELATED APPLICATION

This patent application claims the benefit of priority under 35 U.S.C. § 119(e) to U.S. Provisional Application No. 63/678,281 filed on Aug. 1, 2024, which is incorporated herein by reference in its entirety.

BACKGROUND

1. Field

Various embodiments of the present disclosure relate to a semiconductor design technology, and more particularly, to a fault management device that performs a mapping operation between a defective address and a repair address according to the result of a fault analysis.

2. Description of the Related Art

A memory system may generate defective addresses for a memory device based on a fault analysis result. The memory system may sequentially store the defective addresses and, when an input address is searched from the stored defective addresses, the memory system can provide a repair address mapped to the defective address in the memory device. Through such an address remapping operation, the memory device may minimize the occurrence of errors by utilizing redundancy memory cells designated by the repair address instead of utilizing defective memory cells.

In order to shorten the search time, the memory system stores defective addresses using a content addressable memory (CAM). Currently, a 1:1 entry method is used to store one defective address in one CAM entry. In order to store a plurality of defective addresses, a corresponding number of CAM entries is required, and as the number of defective addresses increases, the storage area occupied by the CAM increases, limited resources can cause difficulties. Therefore, various methods for efficiently managing CAM entries are under discussion.

SUMMARY

Embodiments of the present disclosure are directed to a fault management device and a fault management method capable of storing a plurality of defective addresses (hereinafter, referred to as "fault addresses") in one CAM entry based on information on faults (hereinafter, referred to as "multi-row fault information") that have occurred in two or more sub-word lines from among a plurality of sub-word lines arranged in a memory device.

In accordance with an embodiment of the present disclosure, a fault management device includes: a first storage circuit configured to receive and sequentially store a fault address of a memory device and to output a selection signal by comparing stored fault addresses with an input address; a second storage circuit configured to store repair addresses corresponding to the stored fault addresses to output a selected repair address corresponding to the selection signal; and a mapping control circuit configured to control the first storage circuit to mask one or more bits of the received fault address according to a mode information signal indicating faults in two or more sub-word lines, among a plurality of sub-word lines arranged in the memory device, and to control the second storage circuit to mask one or more bits of a repair address corresponding to the masked bits of the received fault address.

In accordance with an embodiment of the present disclosure, a fault management device includes: a first storage circuit configured to receive and sequentially store a fault address generated based on data output from a memory device while masking one or more bits of the received fault address according to a mode information signal indicating faults in two or more sub-word lines among a plurality of sub-word lines arranged in the memory device, and to output a selection signal by comparing stored fault addresses with an input address; and a second storage circuit configured to mask, according to the mode information signal, one or more bits of a repair address corresponding to the masked bits of the received fault address, among a plurality of repair addresses corresponding to the stored fault addresses, and output a repair address selected according to the selection signal. The second storage circuit may mask one or more least significant bits (LSBs) of the repair address, according to the mode information signal. The second storage circuit may set, when the selected repair address is output, masked bits of the selected repair address by using bits of the input address corresponding to the masked bits of the received fault address.

In accordance with an embodiment of the present disclosure, a controller includes: a fault analysis module configured to analyze an error log to generate a fault address and a mode information signal when a specific fault mode is detected; and a fault management module configured to: during a first operation, store the fault address in a first storage circuit while masking one or more bits of the fault address, and mask one or more bits of a repair address corresponding to the masked bits of the fault address, among a plurality of repair addresses pre-stored in a second storage circuit, according to the mode information signal, and during a second operation, output a selected repair address from the second storage circuit according to a result of comparing stored fault addresses in the first storage circuit with an input address.

In accordance with an embodiment of the present disclosure, a fault management method includes: storing a fault address of a memory device in a first storage circuit while masking one or more bits of the fault address, according to a mode information signal indicating faults in two or more sub-word lines among a plurality of sub-word lines arranged in the memory device; masking one or more bits of a repair address corresponding to the masked bits of the fault address, among a plurality of repair addresses pre-stored in a second storage circuit, according to the mode information signal; searching for an input address from the first storage circuit; and outputting a selected repair address from the second storage circuit according to the search result.

In accordance with an embodiment of the present disclosure, a stacked memory device includes: a lower chip; and one or more upper chips stacked over the lower chip, wherein the lower chip includes: a first storage circuit configured to receive and sequentially store a fault address of the upper chips and output a selection signal by comparing stored fault addresses with an input address; a second storage circuit configured to store repair addresses corresponding to the stored fault addresses to output a selected repair address according to the selection signal; and a mapping control circuit configured to control the first storage circuit to mask one or more bits of the received fault address according to a mode information signal indicating faults in two or more sub-word lines, among a plurality of sub-word lines arranged in the upper chips, and to control the second storage circuit to mask one or more bits of a repair address corresponding to the masked bits of the received fault address.

In accordance with an embodiment of the present disclosure, a memory system includes: a stacked memory device including a lower chip and one or more upper chips; and a controller configured to control the stacked memory device, wherein the controller includes: a first storage circuit configured to receive and sequentially store a fault address of the stacked memory device and output a selection signal by comparing stored fault addresses with an input address; a second storage circuit configured to store repair addresses corresponding to the stored fault addresses to output a selected repair address according to the selection signal; and a mapping control circuit configured to control the first storage circuit to mask one or more bits of the received fault address according to a mode information signal indicating faults in two or more sub-word lines among a plurality of sub-word lines arranged in the stacked memory device, and to control the second storage circuit to mask one or more bits of a repair address corresponding to the masked bits of the received fault address.

According to embodiments of the present disclosure, the memory system may maximize limited CAM resources and minimize resource consumption of the memory controller by storing the defective addresses in one CAM entry based on the multi-row fault information. In addition, according to embodiments of the present disclosure, the memory system may maximize the efficiency of the fault management and improve the performance thereof by managing the defective addresses related to each other based on the architecture of the memory device using one CAM entry.

These and other features and advantages of the embodiments of the present disclosure will become apparent to those skilled in the art from the following detailed description in conjunction with the following drawings.

DETAILED DESCRIPTION

Figure 1:
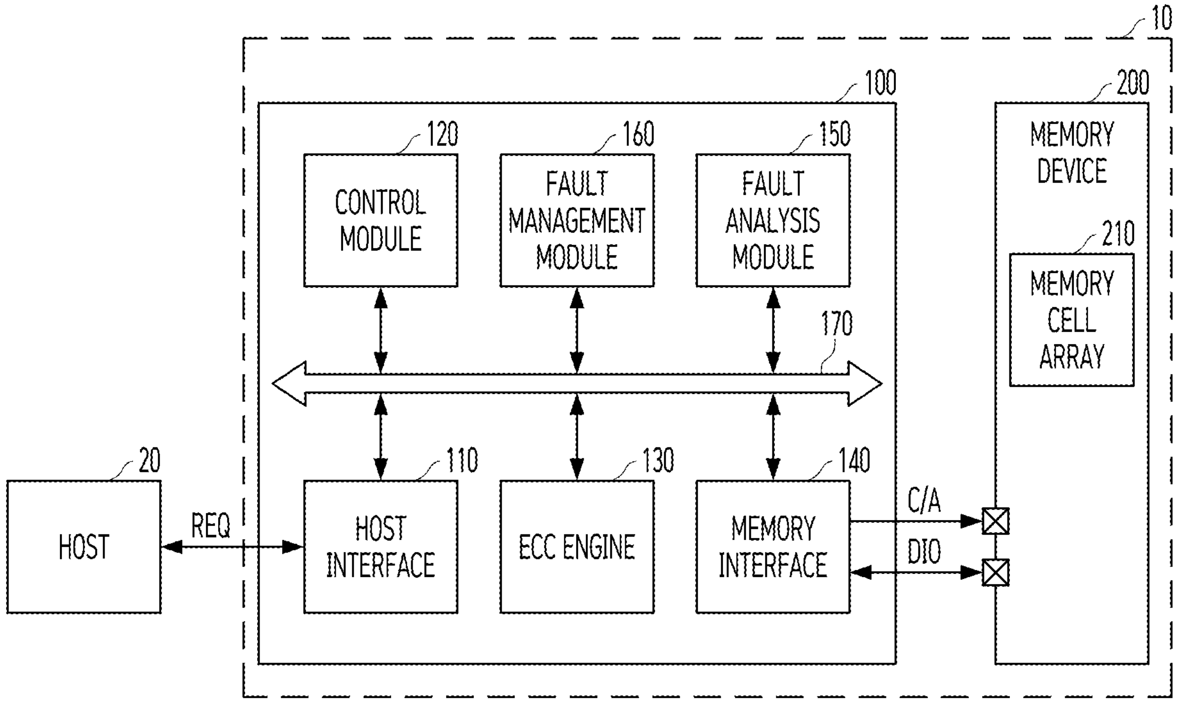
FIG. 1 is a block diagram illustrating a memory system according to an embodiment of the present disclosure.

Various embodiments of the present disclosure will be described below in more detail with reference to the accompanying drawings. The embodiments of the present disclosure may, however, be in different forms and should not be construed as limited to the embodiments set forth herein. Rather, these embodiments are provided so that this disclosure will be thorough and complete, and will fully convey the scope of the present disclosure to those skilled in the art. Throughout this disclosure, like reference numerals refer to like parts throughout the various figures and embodiments of the present disclosure.

It will be understood that when an element is referred to as being "coupled" or "connected" to another element, it may mean that the two are directly coupled or the two are electrically connected to each other with another circuit or element intervening therebetween. It will be further understood that the terms "comprise", "include", "have", etc. when used in this specification, specify the presence of stated features, numbers, steps, operations, elements, components, and/or combinations of them but do not preclude the presence or addition of one or more other features, numbers, steps, operations, elements, components, and/or combinations thereof. In the present disclosure, the singular forms are intended to include the plural forms as well, unless the context clearly indicates otherwise.

Figure 2:
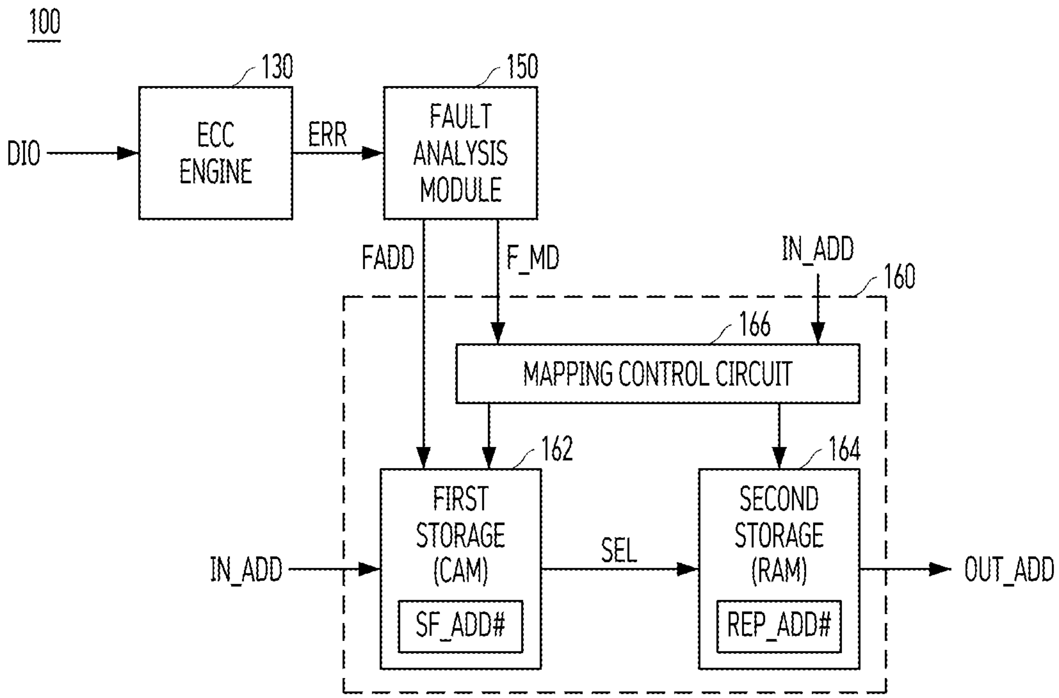
FIG. 2 is a configuration diagram illustrating some components of a memory controller of FIG. 1.

FIG. 1 is a block diagram illustrating a memory system according to an embodiment of the present disclosure. FIG. 2 is a configuration diagram illustrating some components of a memory controller of FIG. 1.

Referring to FIG. 1, a memory system 10 may include a memory controller 100 and a memory device 200. The memory system 10 may store data under the control of a host 20, such as a cellular phone, a smartphone, an MP3 player, a laptop computer, a desktop computer, a game player, a TV, a tablet PC, or an in-vehicle infotainment system. The host 20 may be an external device of the memory system 10.

The memory controller 100 may control operations of the memory system 10 and control data transfer between the host 20 and the memory device 200. The memory controller 100 may generate a command/address signal C/A according to a request REQ from the host 20 and provide the generated command/address signal C/A to the memory device 200. The memory controller 100 may provide data DIO corresponding to the request REQ from the host 20 to the memory device 200, and provide the data DIO read from the memory device 200 to the host 20. For example, the memory controller 100 may provide a write command, address, and data to the memory device 200 during a write operation. During a read operation, the memory controller 100 may provide a read command and address to the memory device 200 and provide data read from the memory device 200 to the host 20.

The memory device 200 may store the data DIO. The memory device 200 may operate under the control of the memory controller 100. The memory device 200 may include a memory cell array 210 including a plurality of memory cells that store data. The memory device 200 may include dynamic random access memory (DRAM) including dynamic memory cells. In an embodiment, the memory device 200 may be a double data rate synchronous dynamic random access memory (DDR SDRAM), a low power double data rate (LPDDR) type SDRAM, a graphics double data rate (GDDR) SDRAM, a Rambus dynamic random access memory (RDRAM), or others.

The memory device 200 is configured to receive the command/address signal C/A from the memory controller 100 to access an area selected from the memory cell array 210. That is, the memory device 200 may perform an operation instructed by a command on the area selected by an address. For example, the memory device 200 may perform a write operation (e.g., program operation) to write data DIO to the area selected by the address. During a read operation, the memory device 200 may read data DIO from the area selected by the address.

The memory controller 100 may include a host interface 110, a control module 120, an error correction code (ECC) engine 130, a memory interface 140, a fault analysis module 150, a fault management module 160, and a bus 170.

The host interface 110 may be an interface for communication between the host 20 and the memory controller 100. The host interface 110 may receive the request REQ from the host 20, receive the data DIO read from the memory device 200 through the memory interface 140, and transfer the received data DIO to the host 20.

The control module 120 may receive the request REQ from the host 20 through the host interface 110. The control module 120 may control each component of the memory controller 100 according to the request REQ. The control module 120 may generate various commands (e.g., an active command, a precharge command, a read command, a write command, etc.) and address, according to the request REQ. For example, the control module 120 may generate an address to be activated together with an active command, and generate an address to be read or written together with a read command or a write command. The control module 120 may set the order of requests to be instructed to the memory device 200 among the requests REQs from the host 20 and generate a command to be applied to the memory device 200 according to the order of the predetermined operations. To improve the performance of the memory device 200, the control module 120 may change the order in which the requests REQs are received from the host 20 and the order of the operations to be instructed to the memory device 200. For example, the control module 120 may adjust the order so that a write operation is performed before a read operation, even if the host 20 requests the read operation of the memory device 200 first and the write operation later.

The ECC engine 130 may correct an error in the data DIO read from the memory device 200, and provide the corrected data to the host 20. When the number of error bits of the data DIO is out of the error correction capability of the ECC engine 130, the control module 120 may notify the host 20 that an uncorrectable error UE has occurred.

The control module 120 may generate a scrub command and a scrub address indicating a scrub operation for a predetermined number of times during a scrub period. For example, the control module 120 may generate the scrub command and the scrub address for the number of times required to check errors of all memory cells of the memory device 200 for a 24 hour period. The scrub operation may include a read operation for reading data from the memory device 200, an error check operation for checking and correcting an error in the read data, and a re-write operation for writing the error-corrected data back to the memory device 200. The control module 120 may transmit the scrub command together with the scrub address indicating a read operation and a re-write operation to the memory device 200, and the ECC engine 130 may perform an error check operation. For example, as shown in FIG. 2, the ECC engine 130 may generate an error information ERR according to the error check operation.

The memory interface 140 may be configured to communicate with the memory device 200. The memory interface 140 may transmit the command/address signal C/A and the data DIO to the memory device 200, and receive the data DIO read from the memory device 200. For example, the memory interface 140 may provide the command/address signal C/A corresponding to a command and address generated by the control module 120 to the memory device 200. In addition, the memory interface 140 may provide the data DIO corresponding to the request REQ provided from the host interface 110 to the memory device 200.

The fault analysis module 150 may accumulate the error information ERR generated by the ECC engine 130 during the error check operations. For example, as shown in FIG. 2, the fault analysis module 150 may generate error logging information (e.g., an error log) by accumulating the error information ERR during a preset monitoring section, and generate a fault address FADD by analyzing a fault of the memory device 200 based on the error log. When a specific fault mode is detected according to a fault analysis result, the fault analysis module 150 may generate a mode information signal F_MD including fault information on the detected specific fault mode. In an embodiment, a specific fault mode may be detected when faults (hereinafter, referred to as "a multi-row fault") have occurred in two or more sub-word lines among a plurality of sub-word lines arranged in the memory device 200, and the fault address FADD may include a row address designating a defective sub-word line. Detailed embodiments for multi-row faults will be described later. The fault analysis module 150 may provide the fault address FADD and the mode information signal F_MD to the fault management module 160. The fault analysis module 150 may also be referred to as a fault analysis device, and may be disposed outside the memory controller 100 to provide the fault address FADD and the mode information signal F_MD to the memory controller 100.

Depending on the embodiment, the fault analysis module 150 may analyze a fault of the memory device 200 by reflecting device information about the memory device 200 in the error log. The memory cell array 210 of the memory device 200 may be composed of a plurality of banks. Each bank may include a plurality of cell blocks arranged in an array form. The device information may include architectural information about a plurality of cell blocks included in each bank, and data input/output information. The fault analysis module 150 may check error locations of data output from the plurality of cell blocks based on the error log, configure a physical layout of the plurality of cell blocks based on the architectural information to identify bad cell blocks, including the error locations, and analyze faults of the bad cell blocks according to the data input/output information. The fault analysis module 150 may store the device information regarding various devices in advance and extract a corresponding device information based on unique product information received from the memory device 200 during boot-up.

The fault management module 160 may perform a first operation of storing the fault address FADD, and a second operation of outputting a target address OUT_ADD to the memory device 200 according to a result of comparing an input address IN_ADD, provided from the host 20, with stored fault addresses. The first operation may be defined as an address storage operation, and the second operation may be defined as an address remapping operation.

Referring to FIG. 2, the fault management module 160 may selectively mask one or more bits of the fault address FADD according to the mode information signal F_MD while sequentially storing the fault address FADD in a first storage circuit (CAM) 162 during the first operation. In addition, the fault management module 160 may mask one or more bits of a repair address corresponding to the masked fault address, from among a plurality of pre-stored repair addresses REP_ADD # (where # is an integer greater than or equal to 1) stored in a second storage circuit (RAM) 164, during the first operation.

During the second operation, the fault management module 160 may select one of the pre-stored repair addresses REP_ADD # according to a result of comparing a plurality of stored fault addresses SF_ADD # stored in the first storage circuit 162 with an input address IN_ADD, and output the selected repair address as the target address OUT_ADD. In addition, during the second operation, the fault management module 160 may output the target address OUT_ADD by setting the masked bits of the selected repair address to high bits or low bits by using bits of the input address IN_ADD corresponding to the masked bits of the fault address FADD. Finally, the target address OUT_ADD may be transmitted to the memory device 200 in the form of a command/address signal C/A through the memory interface 140.

In detail, the fault management module 160 may include the first storage circuit 162, the second storage circuit 164, and a mapping control circuit 166.

The first storage circuit 162 may be implemented with a known content addressable memory (CAM). The CAM may perform a quick search by directly searching data without accessing data by an address. The first storage circuit 162 may sequentially store the fault address FADD provided from the fault analysis module 150. When the input address IN_ADD is inputted from the host 20, the first storage circuit 162 may output the selection signal SEL by comparing the stored fault addresses SF_ADD # with the input address IN_ADD. The selection signal SEL may be composed of a number of bits for designating the stored fault addresses SF_ADD #, respectively. For example, a 5-bit selection signal SEL may be provided to designate 32 stored fault addresses SF_ADD0 to SF_ADD31. The first storage circuit 162 may output a selection signal SEL of "00011" when the fourth fault address SF_ADD3 of the 32 stored fault addresses SF_ADD0 to SF_ADD31 is identical to the input address IN_ADD.

The second storage circuit 164 may be implemented with a known random access memory (RAM). The RAM may output pre-stored data according to a search result (i.e., the selection signal SEL) of the CAM. For example, the second storage circuit 164 may include static RAM (SRAM), dynamic RAM (DRAM), phase change RAM (PCRAM), resistive RAM (ReRAM), etc. The second storage circuit 164 may store the repair addresses REP_ADD # respectively corresponding to the stored fault addresses SF_ADD # in advance, and output a repair address selected according to the selection signal SEL among the pre-stored repair addresses REP_ADD # as the target address OUT_ADD.

The mapping control circuit 166 may control the first storage circuit 162 to mask and store one or more bits of the fault address FADD provided from the fault analysis module 150 according to the mode information signal F_MD provided from the fault analysis module 150, and control the second storage circuit 164 to mask one or more bits of the repair address corresponding to the masked fault address, during the first operation. In addition, the mapping control circuit 166 may control the second storage circuit 164 to output the target address OUT_ADD by setting the masked bits of the selected repair address to high bits or low bits by using the bits of the input address IN_ADD corresponding to the masked bits of the fault address FADD, during the second operation.

A detailed configuration and operation of the fault management module 160 will be described with reference to FIGS. 7 to 18D.

Referring back to FIG. 1, the memory controller 100 may transmit data between the host interface 110, the control module 120, the ECC engine 130, the memory interface 140, the fault analysis module 150, and the fault management module 160 through the bus 170. According to an embodiment, the host interface 110, the control module 120, the ECC engine 130, the memory interface 140, the fault analysis module 150, and the fault management module 160 may communicate with each other independently without passing through the bus 170. For example, the fault analysis module 150 and the host interface 110 may communicate directly with each other without passing through the bus 170, and the host interface 110 and the memory interface 140 may also communicate directly with each other without passing through the bus 170.

Hereinafter, before describing a multi-row fault, a structure of the memory cell array 210 in an embodiment of the present disclosure will be described.

Figure 3A:
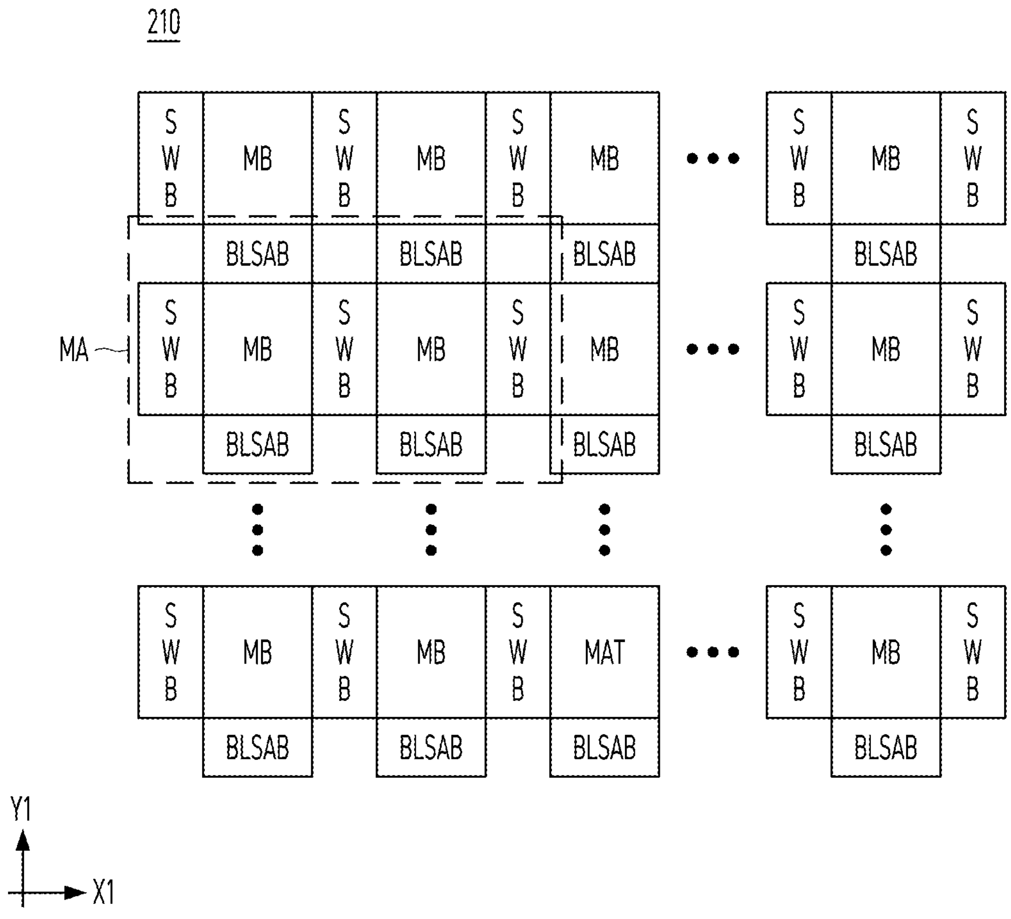
FIGS. 3A and 3B are diagrams for describing a memory cell array of FIG. 1 according to an embodiment of the present disclosure.
Figure 3B:
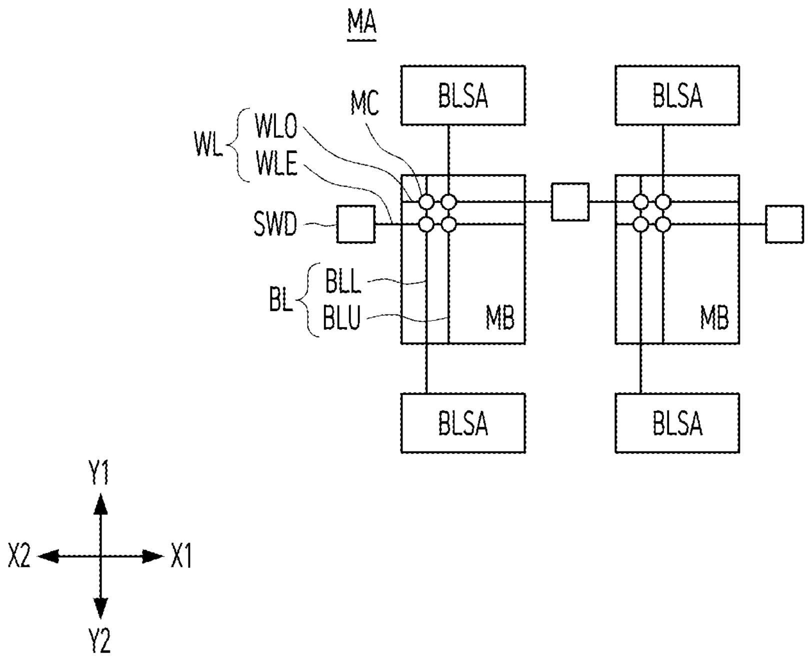

FIGS. 3A and 3B are diagrams for describing a memory cell array of FIG. 1 according to an embodiment of the present disclosure.

Referring to FIG. 3A, a memory cell array 210 may include a plurality of cell blocks MB arranged in an array form in a first direction X1 (hereinafter, referred to as a "row direction X1") and a second direction Y1 (hereinafter, referred to as a "column direction Y1"), which intersects the row direction X1. Each cell block MB may include a plurality of memory cells MC connected between a plurality of word lines WL and a plurality of bit lines BL. The cell blocks MB arranged in the row direction X1 may be divided into the bit lines BL, and the cell blocks MB arranged in the column direction Y1 may be divided into the word lines WL. Sub-word line driver regions SWB may be arranged between the cell blocks MB in the row direction X1. A plurality of sub-word line drivers may be disposed in the sub-word line driver region SWB. Bit line sense amplifier regions BLSAB may be arranged between the cell blocks MB in the column direction Y1. A plurality of bit line sense amplifiers may be disposed in the bit line sense amplifier region BLSAB. In an embodiment of the present disclosure, the "cell block" may be defined as a set of memory cells that share word lines WL and bit lines BL and that are arranged in the same form.

For reference, in order to reduce propagation delay of a word line voltage, which occurs as the number of memory cells connected to the word lines increases and a distance between the word lines decreases, one main word line may be divided into a plurality of (e.g., eight) sub-word lines, which are driven by the sub-word line drivers. Hereinafter, the word lines WL mentioned in the present disclosure may correspond to known sub-word lines, and the sub-word line drivers may be referred to as word line drivers.

Referring to FIG. 3B, a partial area MA of FIG. 3A is shown.

Each of the cell blocks MB may include memory cells MC connected between the word lines WL and the bit lines BL.

The squares between the cell blocks MB may represent the sub-word line drivers SWD, and the lines extending to the left and right of the sub-word line drivers SWD may represent the word lines. In reality, a much larger number of sub-word line drivers SWD and word lines exist, but only a part of the lines are shown to simplify the illustration.

Each of the cell blocks MB may include odd-numbered word lines (hereinafter, referred to as "first word lines WLO") and even-numbered word lines (hereinafter, referred to as "second word lines WLE") extending in the row direction X1 and alternating with each other in the column direction Y1. In odd-numbered cell blocks MB, the first word lines WLO may share sub-word line drivers SWD with an adjacent cell block in the row direction X1, and the second word lines WLE may share sub-word line drivers SWD with an adjacent cell block in a direction X2 opposite to the row direction X1. Conversely, in even-numbered cell blocks MB, the second word lines WLE may share sub-word line drivers SWD with an adjacent cell block in the row direction X1, and the first word lines WLO may share sub-word line drivers SWD with an adjacent cell block in the direction X2. That is, since two adjacent cell blocks MB in the row direction X1 share sub-word line drivers SWD, one sub-word line driver SWD may be allocated to two adjacent cell blocks MB in the row direction X1.

Each of the cell blocks MB may include first bit lines BLU and second bit lines BLL extending in the column direction Y1 and alternately disposed in the row direction X1. The first bit lines BLU may share bit line sense amplifiers BLSA with an adjacent cell block (not illustrated) in the column direction Y1, and the second bit lines BLL may share bit line sense amplifiers BLSA with an adjacent cell block (not illustrated) in a direction Y2 opposite to the column direction Y1. That is, since two adjacent cell blocks MB in the column direction Y1 share bit line sense amplifiers BLSA, one bit line sense amplifier BLSA may be allocated to two adjacent cell blocks MB in the column direction Y1.

Figure 4:
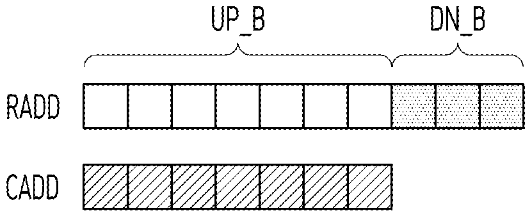
FIG. 4 is a block diagram illustrating a configuration of a row address and a column address for accessing a memory cell array of FIG. 1.

FIG. 4 is a block diagram illustrating a configuration of a row address and a column address for accessing a memory cell array of FIG. 1.

Referring to FIG. 4, a row address RADD for designating word lines WL of a memory cell array 210 and a column address CADD for designating bit lines BL are illustrated.

The row address RADD may be divided into an upper bit group UP_B assigned to 128 main word lines and a lower bit group DN_B assigned to 8 sub-word lines allocated to one main word line. For example, the row address RADD may be divided into a 7-bit upper bit group UP_B for designating 128 main word lines and a 3-bit lower bit group DN_B for designating eight sub-word lines.

The column address CADD may be composed of bits for designating one of a plurality of columns, and a predetermined number of bit lines may be selected when one column is selected. For example, the column address CADD is composed of 7-bits assigned to 128 columns, and eight bit lines may be selected when one column is designated.

In an embodiment, in order to access the memory cell array 210, a block address for designating a plurality of cell blocks may be further generated, and a bank address, a rank address, and a channel address may be further configured depending on a configuration of a memory device 200.

Figure 5:
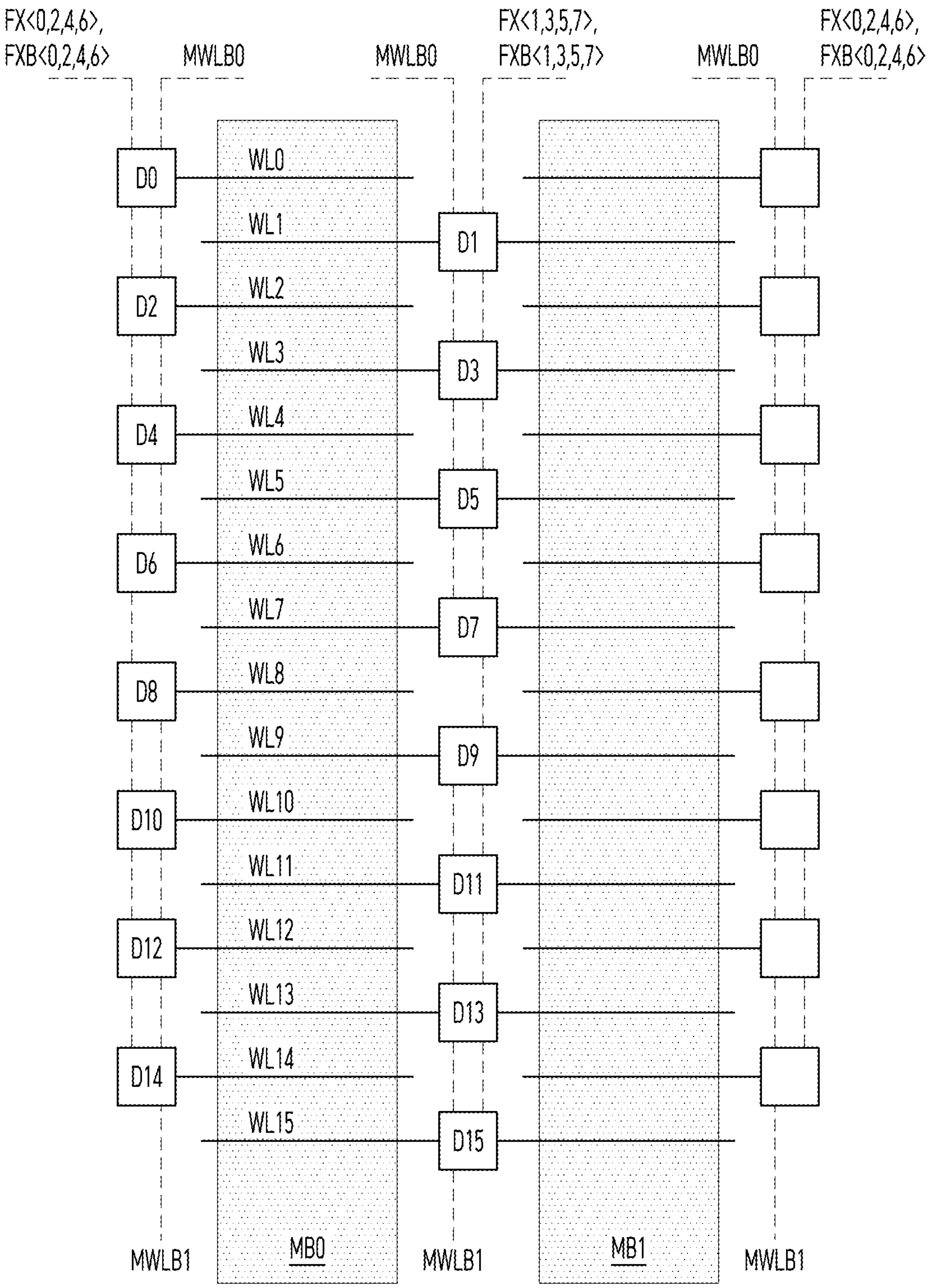
FIG. 5 is a diagram for describing an arrangement of sub-word line drivers.
Figure 6:
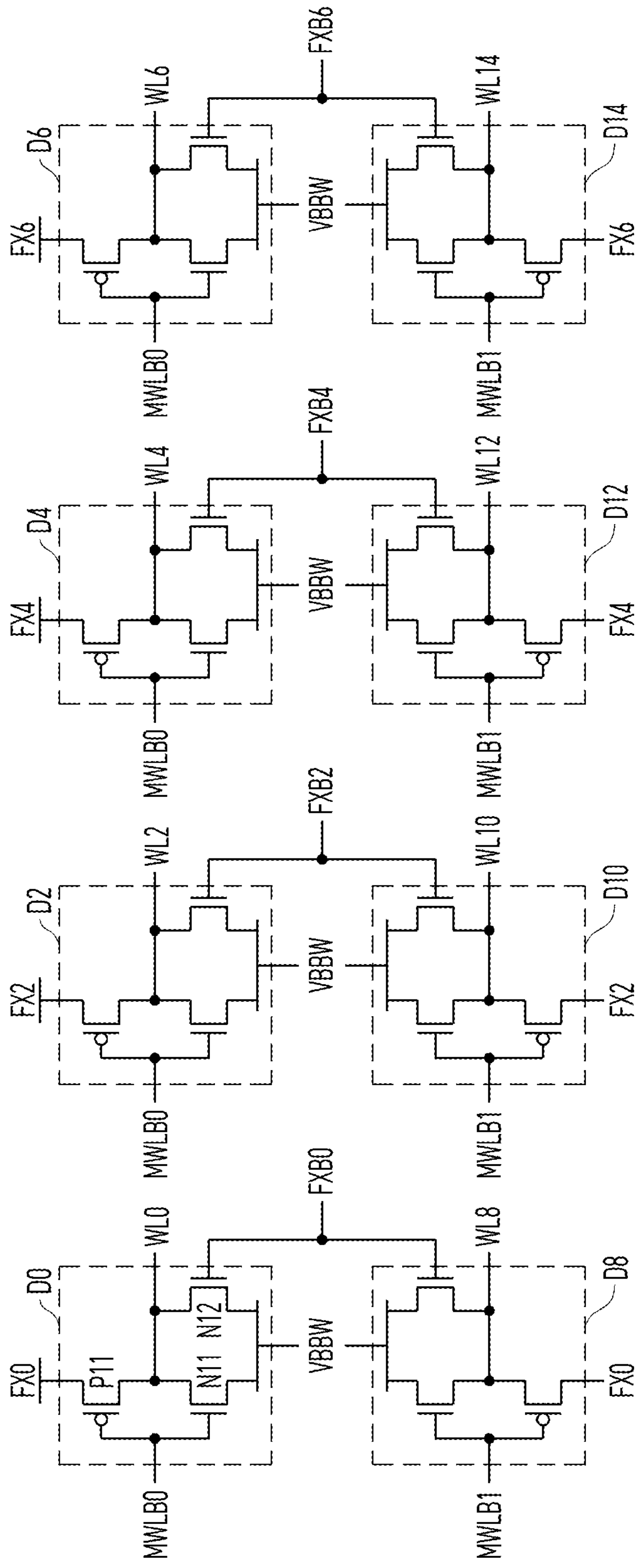
FIG. 6 is a circuit diagram illustrating sub-word line drivers of FIG. 5.

FIG. 5 is a diagram for illustrating an arrangement of sub-word line drivers according to an embodiment of the present disclosure. FIG. 6 is a circuit diagram illustrating sub-word line drivers of FIG. 5.

Referring to FIG. 5, a first cell block MB0 and a second cell block MB1 adjacent to each other in a row direction are illustrated. FIG. 5 illustrates two main word lines arranged per cell block, and eight sub-word lines arranged per main word line. That is, first to sixteenth sub-word lines (i.e., rows WL0 to WL15) may extend in a row direction and may be alternately arranged in a column direction, respectively, in the first cell block MB0 and the second cell block MB1.

First to sixteenth sub-word line drivers D0 to D15 for driving the first to sixteenth sub-word lines WL0 to WL15 may be alternately disposed on opposite sides of each cell block. For example, odd-numbered sub-word line drivers disposed at one side of each cell block may drive odd-numbered sub-word lines, and even-numbered sub-word line drivers disposed at the other side may drive even-numbered sub-word lines.

The first to eighth sub-word line drivers D0 to D7 may receive a first main word line driving signal MWLB0 in common, receive respective signals of first and second word line selection signals FX<0:7> and FXB<0:7>, and drive the first to eighth sub-word lines WL0 to WL7. The ninth to sixteenth sub-word line drivers D8 to D15 may receive a second main word line driving signal MWLB1 in common, receive respective signals of the first and second word line selection signals FX<0:7> and FXB<0:7>, and drive the ninth to sixteenth sub-word lines WL8 to WL15. Here, the main word line driving signals MWLB0 and MWLB1 may mean a driving signal transmitted through a main word line.

Referring to FIG. 6, the sub-word line drivers D0, D2, D4, D6, D8, D10, D12, and D14 disposed at one side of the first cell block MB0 in FIG. 5 are illustrated. Since each of the sub-word line drivers has the same configuration, the first sub-word line driver D0 will be described as an example.

The first sub-word line driver D0 may include a PMOS transistor P11 and NMOS transistors N11 and N12. The PMOS transistor P11 and the NMOS transistor N11 are coupled in series between an input terminal of the first word line selection signal FX0 and a back bias voltage (VBBW) (or ground voltage VSS) terminal, and receive the main word line driving signal MWLB0 through a common gate. The NMOS transistor N12 is connected between the sub-word line WL0 and the back bias voltage (VBBW) terminal, and receives the second word line selection signal FXB0 through a gate.

In a sub-word line driver structure described in FIG. 6, when a defect occurs in a contact shared by the sub-word line drivers, sub-word lines driven by the corresponding sub-word line drivers may be defective. For example, when a defect occurs in a contact for the back bias voltage VBBW, which is shared by the first and ninth sub-word line drivers D0 and D8, the first and ninth sub-word lines WL0 and WL8 may be defective. That is, when a sub-word line at a same order, among eight sub-word lines coupled to each of the two adjacent main word lines, is defective, a defect in a contact shared by the corresponding sub-word line drivers may be the cause. Here, when first to 16th sub-word lines are assigned to two adjacent main word lines, the first and ninth sub-word lines configure sub-word lines at the same order, the second and tenth sub-word lines configure sub-word lines at the same order, and in this way, the eighth and 16th sub-word lines configure sub-word lines at the same order.

Furthermore, in a sub-word line driver structure described in FIG. 6, when a defect occurs in a signal path for applying a word line selection signal, sub-word lines driven by sub-word line drivers receiving the corresponding word line selection signal may be defective. For example, when a defect occurs in a signal path for applying a first word line selection signal FX0 is defective, the first and ninth sub-word lines WL0 and WL8 driven by the first and ninth sub-word line drivers D0 and D8 may be defective. That is, when a sub-word line at a same order, among eight sub-word lines coupled to each of a plurality of main word lines, is defective, a defect in a signal path commonly provided to the corresponding sub-word line drivers may be the cause.

As described above, a defect in the architecture of the memory device may cause faults in two or more sub-word lines (i.e., a multi-row fault). In an embodiment, the fault analysis module 150 may generate the mode information signal F_MD including information about a multi-row fault by analyzing an error log collected based on data read from the memory device 200. For example, a multi-row fault may be detected when sub-word lines at a same order coupled to two adjacent main word lines are defective (see FIG. 8A), sub-word lines at a same order coupled to a plurality of main word lines are defective (see FIG. 9A), when odd-numbered or even-numbered sub-word lines are defective (see FIG. 10A), when sub-word lines coupled to one main word line are defective (see FIGS. 11A and 12A), when two or more sub-word lines at the same orders coupled to two adjacent main word lines are defective (see FIG. 13A). When the number of error bits of data output from memory cells coupled to the corresponding word line exceeds a threshold value, it is determined that the corresponding word line is defective or a defect occurs in the corresponding word line.

A multi-row fault according to an embodiment of the present disclosure is not limited to the above examples, and may include all cases in which a fault occurs in two or more sub-word lines due to various defects.

Hereinafter, a detailed configuration and operation of the fault management module 160 will be described.

Figure 7:
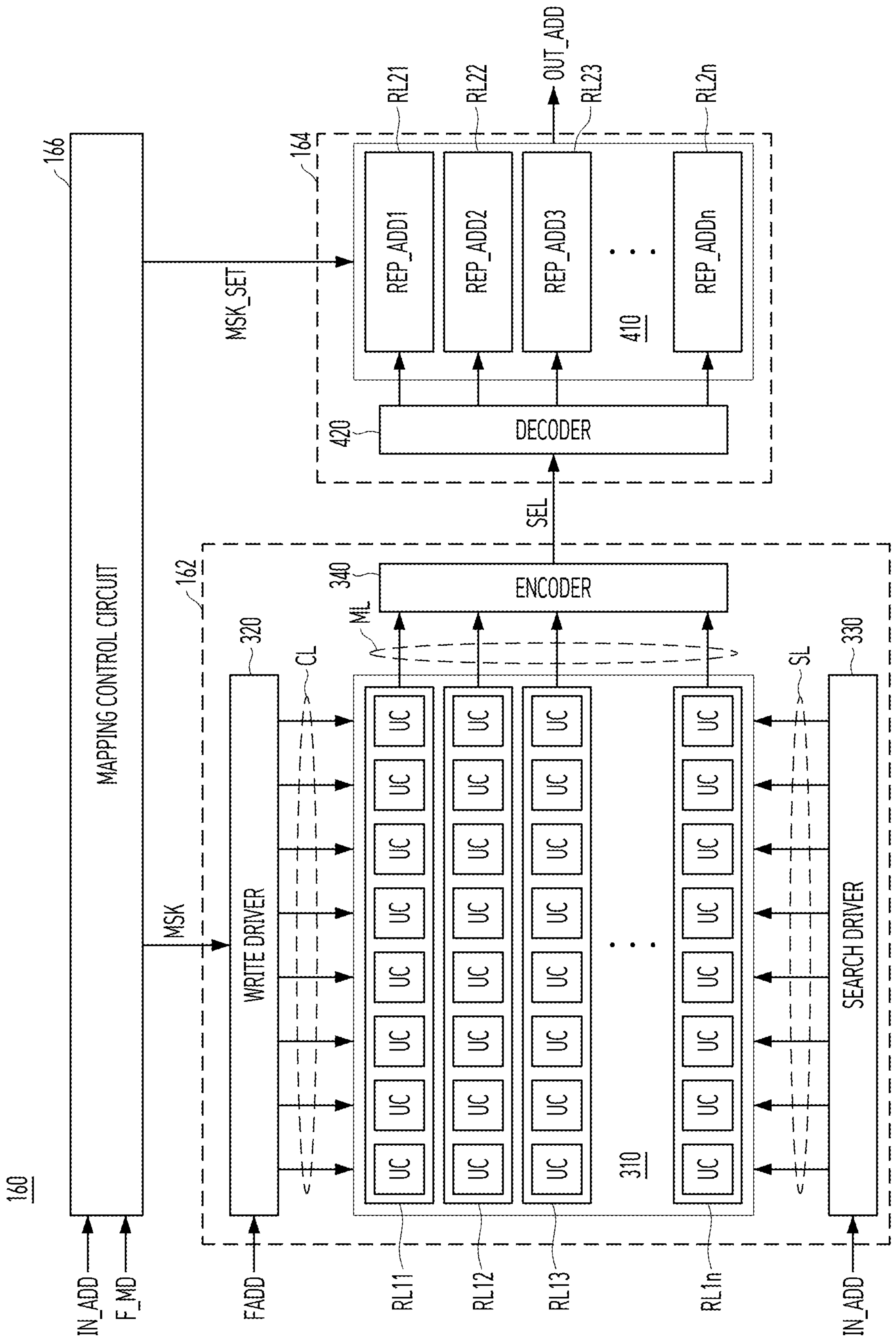
FIG. 7 is a configuration diagram illustrating a fault management module of FIG. 1.

FIG. 7 is a configuration diagram illustrating a fault management module of FIG. 1. FIGS. 8A to 13B are diagrams for describing operations of a mapping control circuit according to a mode information signal according to embodiments of the disclosure. FIG. 14 is a configuration diagram illustrating a unit cell of a unit cell array of FIG. 7.

Referring to FIG. 7, a mapping control circuit 166 may generate a masking signal MSK according to the mode information signal F_MD, and provide the masking signal MSK to the first storage circuit 162, during the first operation. The masking signal MSK is a signal provided for masking one or more bits of the fault address FADD, and may be configured by the number of bits corresponding to the number of bits of the fault address FADD. The mapping control circuit 166 may set a specific bit of the masking signal MSK to a high bit so as to mask a corresponding bit of the fault address FADD. That is, the mapping control circuit 166 may make the specific bit of the masking signal MSK as a "don't care" bit (hereinafter, represented by an "x").

Figure 8A:
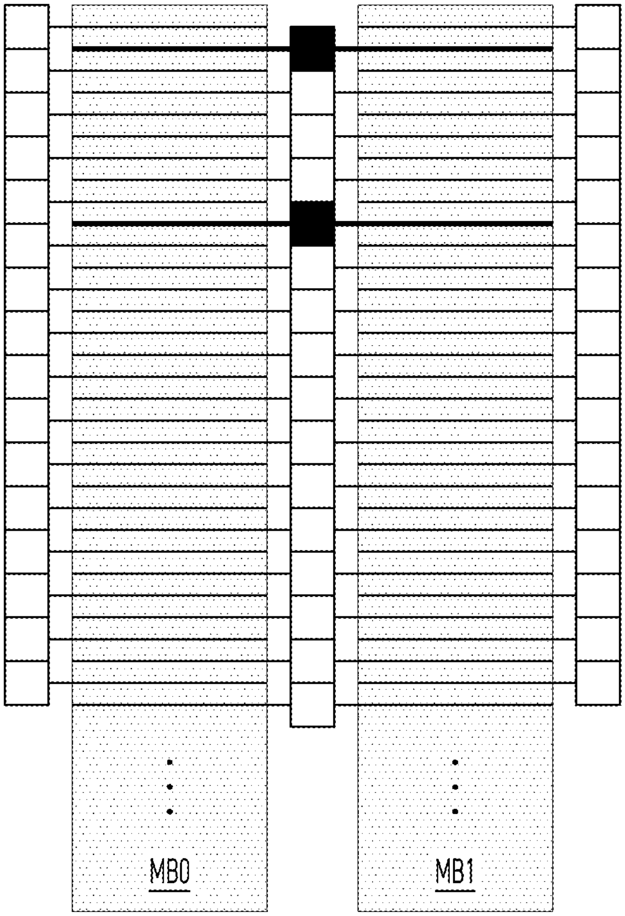
FIGS. 8A to 13B are diagrams for describing operations of a mapping control circuit according to a mode information signal according to embodiments of the disclosure.
Figure 8B:
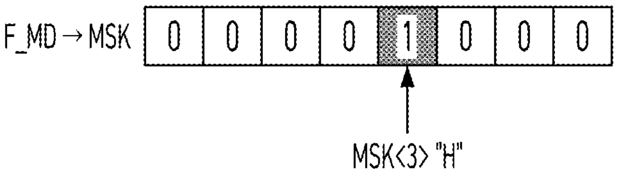

For example, FIG. 8A illustrates a defect occurring in sub-word lines at a same order (e.g., a second order) coupled to two adjacent main word lines. In this case, the mapping control circuit 166 may set a specific bit of the masking signal MSK to a high bit in order to make a bit designating two adjacent main word lines, among bits of the fault address FADD, as a "don't care" bit. For example, referring to FIG. 8B, the mapping control circuit 166 may generate a masking signal MSK of "0000 1000" in which a fourth bit MSK<3> is set to a high bit since two adjacent main word lines are designated by the least significant bit (LSB) of the upper bit group UP_B of the row address RADD of FIG. 4.

Figure 9A:
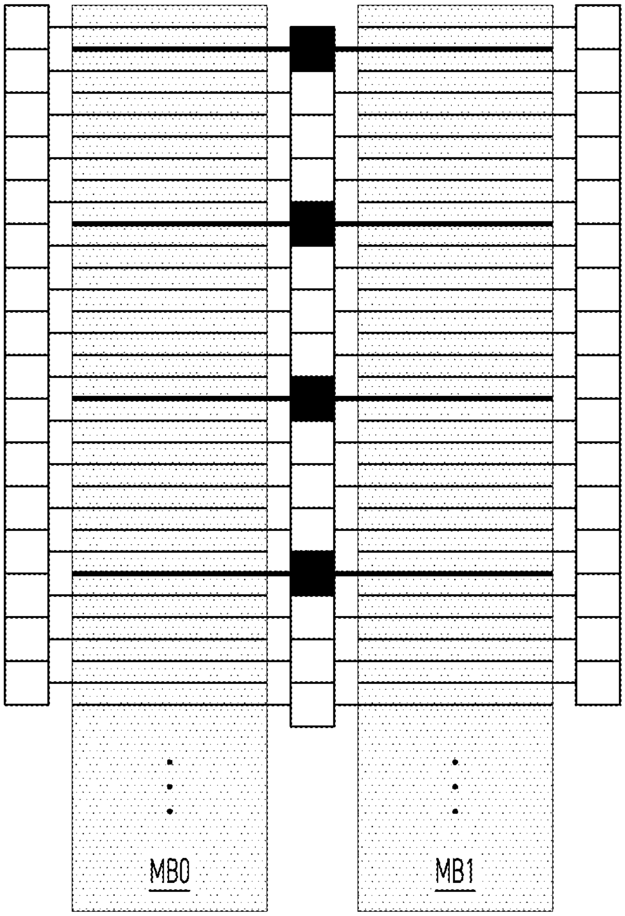
Figure 9B:
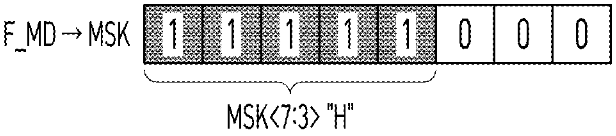

Referring to FIG. 9A, a defect occurs in sub-word lines at a same order (e.g., a second order) coupled to a plurality of main word lines. In this case, the mapping control circuit 166 may set some bits of the masking signal MSK to high bits in order to make bits designating the plurality of main word lines, among bits of the fault address FADD, as "don't care" bits. For example, referring to FIG. 9B, the mapping control circuit 166 may generate a masking signal MSK of "1111 1000" In which fourth to eighth bits MSK<7:3> are set to high bits since the plurality of main word lines are designated by the upper bit group UP_B of the row address RADD of FIG. 4.

Figure 10A:
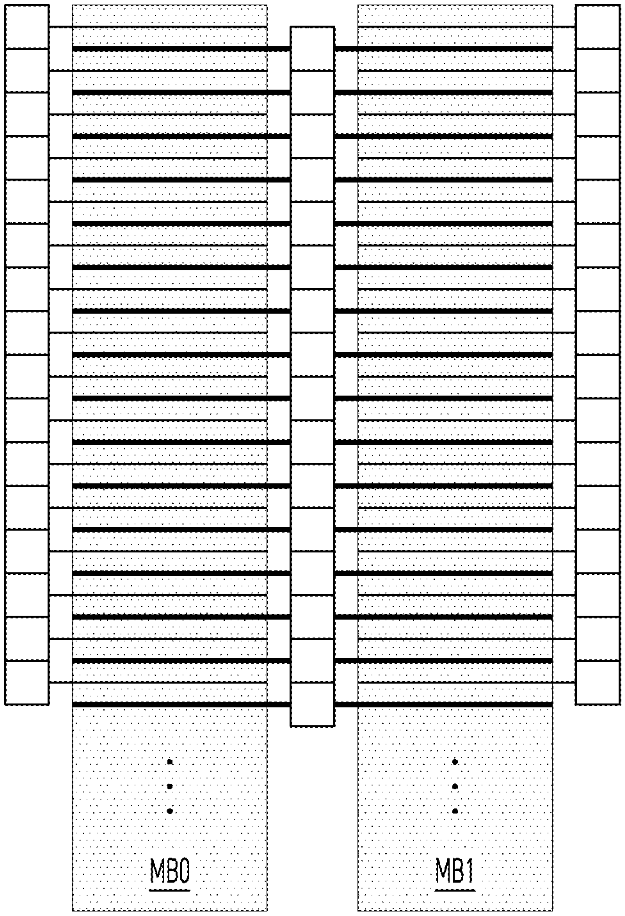
Figure 10B:
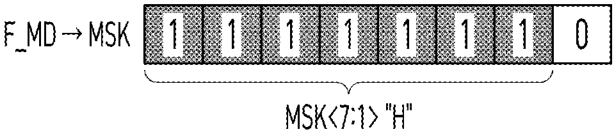

Referring to FIG. 10A, a defect occurs in all even-numbered (or odd-numbered) sub-word lines. In this case, the mapping control circuit 166 may set some bits of the masking signal MSK to high bits in order to make bits of the fault address FADD, except for the LSB designating all even-numbered (or odd-numbered) sub-word lines, as "don't care" bits. For example, referring to FIG. 10B, the mapping control circuit 166 may generate a masking signal MSK of "1111 1110" in which second to eighth bits MSK<7:1> are set to high bits since all even-numbered (or odd-numbered) sub-word lines are designated by the LSB of the row address RADD of FIG. 4.

Figure 11A:
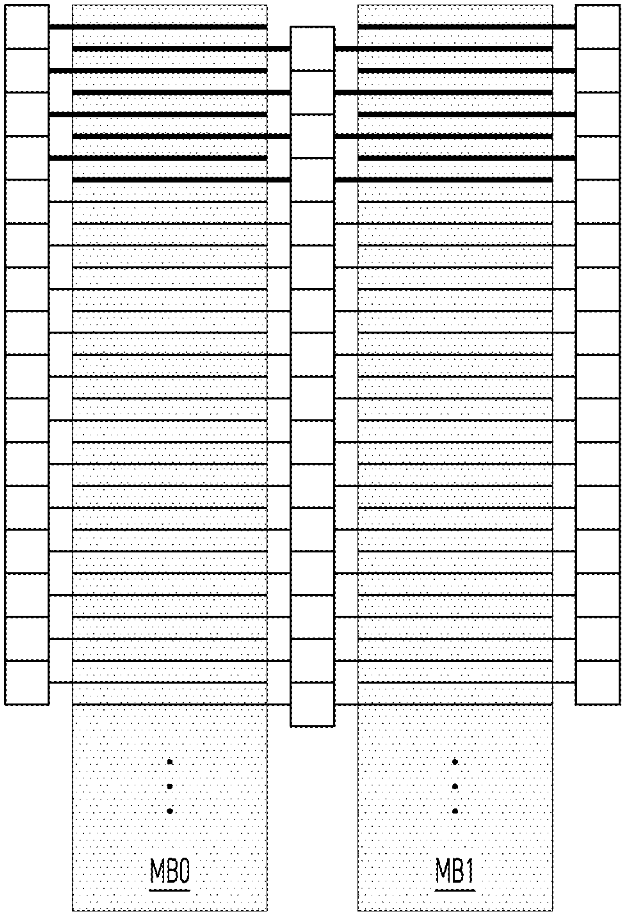
Figure 11B:
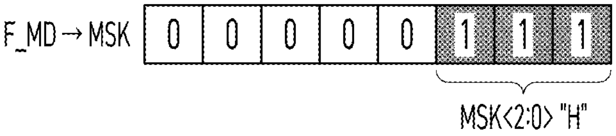

Referring to FIG. 11A, a defect occurs in all sub-word lines coupled to one main word line. In this case, the mapping control circuit 166 may set bits of the masking signal MSK to high bits in order to make bits designating all sub-word lines, among bits of the fault address FADD, as "don't care" bits. For example, referring to FIG. 11B, the mapping control circuit 166 may generate a masking signal MSK of "0000 0111" in which first to third bits MSK<2:0> are set to high bits since all sub-word lines are designated by the lower bit group DN_B of the row address RADD of FIG. 4.

Figure 12A:
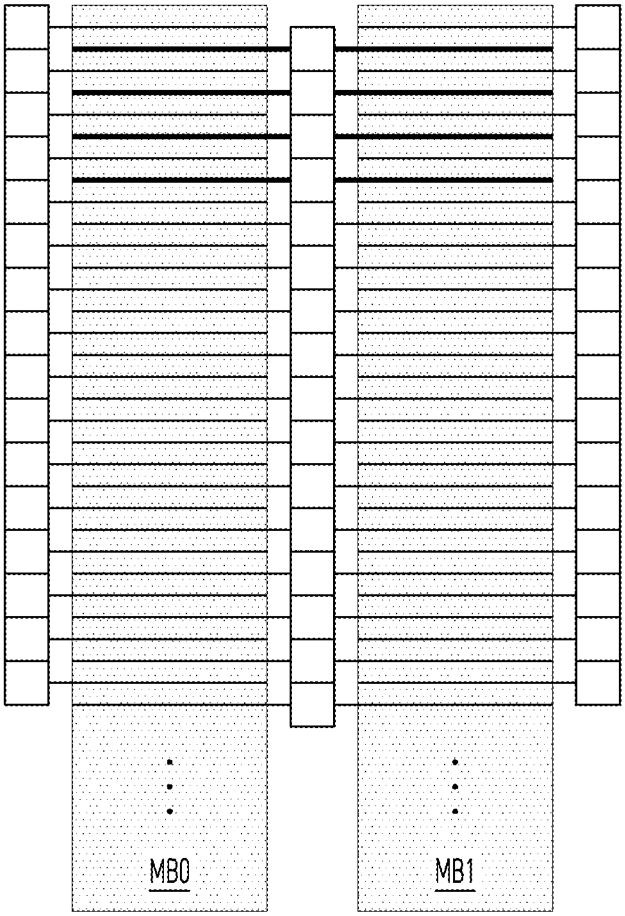
Figure 12B:
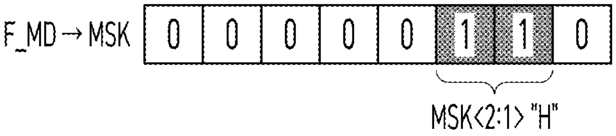

Referring to FIG. 12A, a defect occurs in even-numbered (or odd-numbered) sub-word lines coupled to one main word line. In this case, the mapping control circuit 166 may set bits of the masking signal MSK to high bits in order to make bits, except for a bit designating even-numbered (or odd-numbered) sub-word lines of one main word line, among bits of the fault address FADD, as "don't care" bits. For example, referring to FIG. 12B, the mapping control circuit 166 may generate a masking signal MSK of "0000 0110" in which second and third bits MSK<2:1> are set to high bits.

Figure 13A:
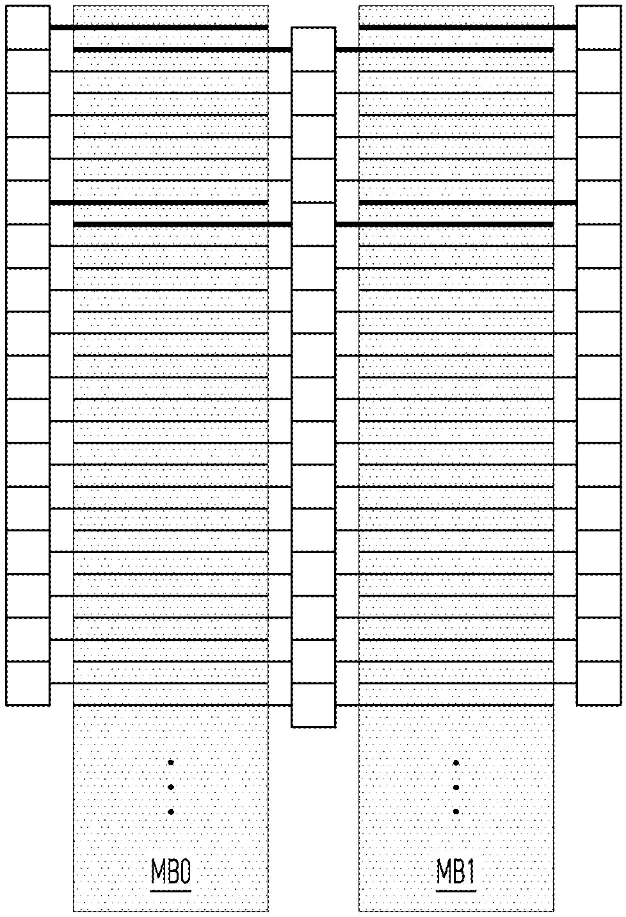
Figure 13B:
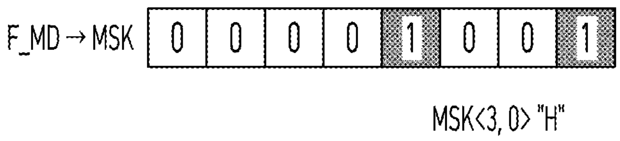
Figure 14:
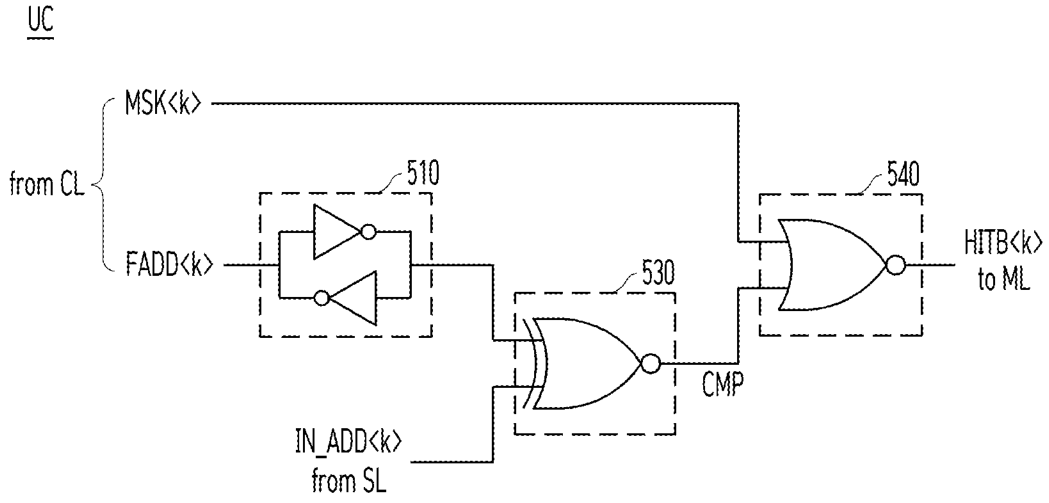
FIG. 14 is a configuration diagram illustrating a unit cell of a unit cell array of FIG. 7.

Referring to FIG. 13A, a defect occurs in sub-word lines of same orders (e.g., first and second orders) coupled to two adjacent main word lines. In this case, the mapping control circuit 166 may set specific bits of the masking signal MSK to high bits in order to make a bit designating two adjacent main word lines and a bit designating the sub-word lines of the same orders, as "don't care" bits, among bits of the fault address FADD. For example, referring to FIG. 13B, the mapping control circuit 166 may generate a masking signal MSK of "0000 1001" in which a fourth bit MSK<3> corresponding to the LSB of the upper bit group UP_B of the row address RADD of FIG. 4 and a first bit MSK<0> corresponding to the LSB of the lower bit group DN_B are set as high bits.

Referring back to FIG. 7, the mapping control circuit 166 may generate a mask-setting signal MSK_SET according to the mode information signal F_MD and the input address IN_ADD, and provide the mask-setting signal MSK_SET to a second storage circuit 164. The mapping control circuit 166 may generate the mask-setting signal MSK_SET for masking one or more bits of a repair address corresponding to the masked fault address according to the mode information signal F_MD, during a first operation. For example, the mapping control circuit 166 may generate the mask-setting signal MSK_SET to mask one or more least significant bits (LSBs) of the repair address. In addition, during a second operation, the mapping control circuit 166 may generate the mask-setting signal MSK_SET for setting the masked bits of the repair address to high bits or low bits according to the input address IN_ADD.

The first storage circuit 162 may include a unit cell array 310, a write driver 320, a search driver 330, and an encoder 340.

The unit cell array 310 may be formed of a plurality of first row fields RL11 to RL1*n*. Each of the first row fields RL11 to RL1*n* may constitute an entry of the CAM. Each of the first row fields RL11 to RL1*n* may be formed of unit cells UC corresponding to bits of the fault address FADD, respectively. For example, in FIG. 7, each of the first row fields RL11 to RL1*n* may be formed of eight unit cells UC corresponding to the number of bits (i.e., 8-bit) of the fault address FADD.

The write driver 320 may be coupled to the unit cell array 310 through a plurality of column lines CL to sequentially provide a fault address FADD and the masking signal MSK to the first row fields RL11 to RL1*n*, during the first operation.

The search driver 330 may be coupled to the unit cell array 310 through a plurality of search lines SL to transmit the input address IN_ADD to the first row fields RL11 to RL1*n*, during the second operation.

The encoder 340 may be coupled to the first row fields RL11 to RL1*n* of the unit cell array 310 through a plurality of match lines ML to generate the selection signal SEL corresponding to an activated match line among the plurality of match lines ML, during the second operation. For example, the encoder 340 may output a selection signal SEL of "00000" when a first match line among 32 match lines is activated.

Referring to FIG. 14, each unit cell UC may receive a bit FADD<k> of the fault address and a bit MSK<k> of the masking signal through the column lines CL, receive a bit IN_ADD<k> of the input address through the search lines SL, and output a match bit HITB<k> to the match lines ML.

Each unit cell UC may include a latch part 510, a comparison part 530, and a masking part 540.

The latch part 510 may store the bit FADD<k> of the fault address. The latch part 510 may be implemented with a cross-coupled inverter latch. In an embodiment (not illustrated), another latch part may be disposed to latch the bit MSK<k> of the masking signal.

The comparison part 530 may output a comparison signal CMP by comparing the stored bit of the latch part 510 with the bit IN_ADD<k> of the input address. The comparison part 530 may output the comparison signal CMP of a logic high level when the stored bit is identical to the bit IN_ADD<k>. The comparison part 530 may be implemented with a logic exclusive NOR (XNOR) gate.

The masking part 540 may output the match bit HITB<k> by selectively masking the comparison signal CMP according to the bit MSK<k> of the masking signal. When the bit MSK<k> of the masking signal is a low bit, the masking part 540 may output the match bit HITB<k> by inverting the comparison signal CMP. On the other hand, when the bit MSK<k> of the masking signal is a high bit, the masking part 540 may output the match bit HITB<k> of a logic low level regardless of a logic level of the comparison signal CMP. The masking part 540 may be implemented as a logic NOR gate.

With the above configuration, when the bit MSK<k> of the masking signal is a low bit, each unit cell UC may output a match bit HITB<k> at a logic low level only when the stored bit is identical to the bit IN_ADD<k> of the input address. On the other hand, when the bit MSK<k> of the masking signal is a high bit, each unit cell UC may output the match bit HITB<k> at a logic low level even if the stored bit is different from the bit IN_ADD<k> of the input address. As a result, each unit cell UC may mask one or more bits of the fault address according to the bit MSK<k> of the masking signal.

The first row fields RL11 to RL1*n* may activate a corresponding match line when the match bits output from the internal unit cells UC are all logic low.

Referring back to FIG. 7, the second storage circuit 164 may include a cell array 410 and a decoder 420.

The cell array 410 may include a plurality of second row fields RL21 to RL2*n* respectively corresponding to a plurality of first row fields RL11 to RL1*n*. The plurality of second row fields RL21 to RL2*n* may store repair addresses REP_ADD1 to REP_ADDn, respectively. For example, the memory device 200 allocates a redundancy area to the memory cell array 210, and the memory controller 100 may store repair addresses REP_ADD1 to REP_ADDn for designating the allocated redundancy area in advance in the plurality of second row fields RL21 to RL2*n*. Each of the second row fields RL21 to RL2*n* may be composed of unit cells having a size corresponding to the number of bits of a repair address.

The decoder 420 may select one of the plurality of second row fields RL21 to RL2*n* by decoding the selection signal SEL, during the second operation. For example, the decoder 420 may select a second row field RL21 according to the selection signal SEL of "00000".

In an embodiment, during the first operation, when the fault address FADD is stored in any one first row field, the corresponding second row field may mask one or more bits of the stored repair address according to the mask-setting signal MSK_SET. In addition, during the second operation, a second row field selected by the selection signal SEL among the plurality of second row fields RL21 to RL2*n* may output its stored repair address as the target address OUT_ADD. In this case, the selected second row field may output its stored repair address as the target address OUT_ADD while setting masked bits of its stored repair address according to the mask-setting signal MSK_SET to high bits or low bits.

In FIG. 7, a configuration in which a mapping control circuit 166 that controls each of the first storage circuit 162 and the second storage circuit 164 is disposed separately from the first storage circuit 162 and the second storage circuit 164. However, the proposed invention is not limited thereto, and according to other embodiments, the mapping control circuit 166 is provided in the first storage circuit 162 and in the second storage circuit 164 respectively, so that the first storage circuit 162 may generate a masking signal MSK according to the mode information signal F_MD, and the second storage circuit 164 may generate a mask-setting signal MSK_SET according to the mode information signal F_MD and the input address IN_ADD.

Hereinafter, an operation of a fault management module 160 according to an embodiment of the present disclosure will be described.

Figure 15:
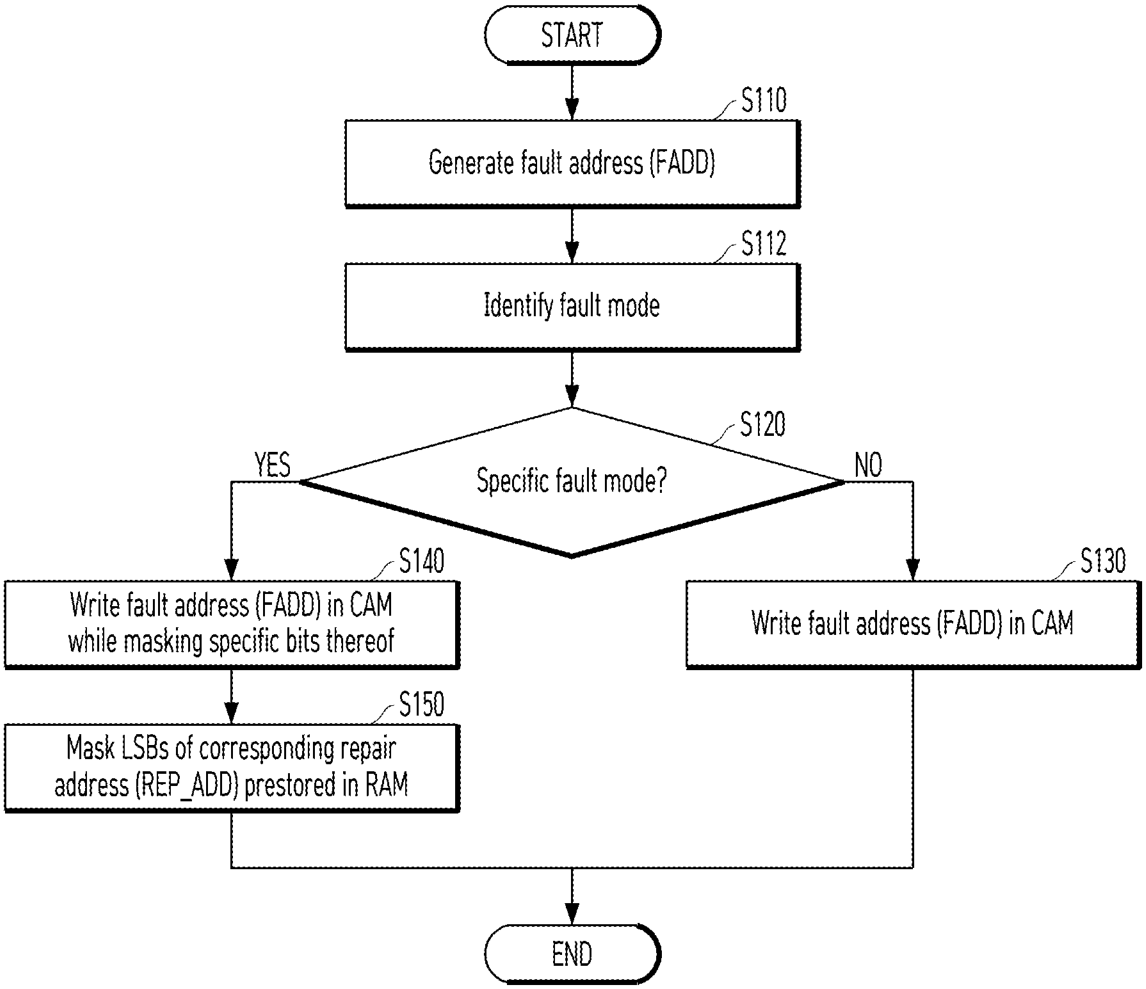
FIG. 15 is a flowchart explaining a first operation of a fault management module according to an embodiment of the present disclosure.
Figure 16A:
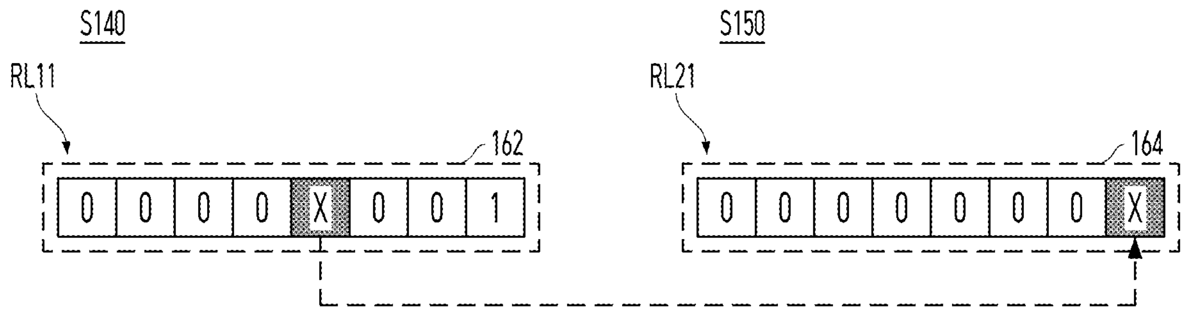
FIGS. 16A to 16C are diagrams that illustrate operations of FIG. 15.
Figure 16B:
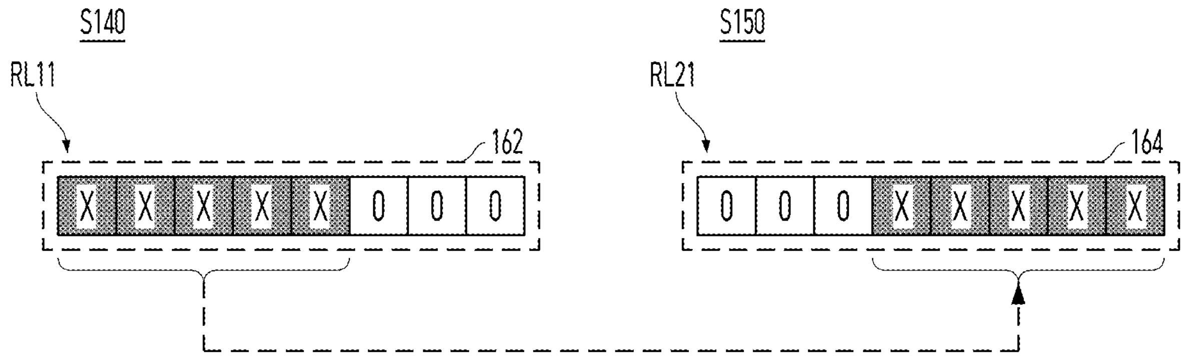
Figure 16C:
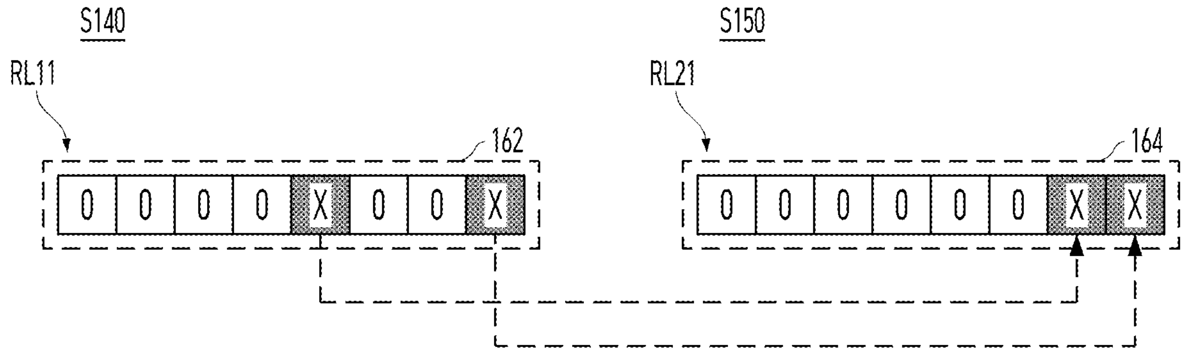

FIG. 15 is a flowchart explaining a first operation of a fault management module according to an embodiment of the present disclosure. FIGS. 16A to 16C are diagrams that illustrate operations of FIG. 15.

Referring to FIG. 15, a fault analysis module 150 may accumulate error information ERR generated by an ECC engine 130 to generate an error log, and analyze a fault of a memory device 200 based on the error log to generate a fault address FADD (at S110). The fault analysis module 150 may identify a fault mode according to a fault analysis result (at S112).

When the fault mode is not identified as a multi-row fault mode ("NO" in S120), the fault analysis module 150 provides the fault address FADD to a fault management module 160. The fault management module 160 may store the fault address FADD in one of first row fields RL11 to RL1*n* of a first storage circuit 162 (at S130). The fault management module 160 stores all bits of the fault address FADD in the unit cells UC of the first row field without masking the fault address FADD, and does not perform an additional masking operation for the repair address stored in the corresponding second row field.

On the other hand, when the fault mode is identified as a multi-row fault ("YES" in S120), the fault analysis module 150 may generate a mode information signal F_MD including the detected fault information and provide the fault address FADD and the mode information signal F_MD to the fault management module 160. The fault management module 160 stores the fault address FADD in one of the first row fields RL11 to RL1*n*, while selectively masking one or more bits of the fault address FADD according to the mode information signal F_MD (at S140). In addition, the fault management module 160 may mask one or more LSBs of the repair address pre-stored in the corresponding second row field of a second storage circuit 164 (at S150).

For example, as shown in FIG. 16A, when sub-word lines at a same order coupled to two adjacent main word lines are defective (see FIG. 8A), the fault management module 160 may make a bit (e.g., a fourth bit FADD<3>) designating two adjacent main word lines, among bits of the fault address FADD, as a don't care bit "x" when storing the fault address FADD in the first row field RL11 (at S140). In addition, the fault management module 160 may make an LSB of the repair address pre-stored in the corresponding second row field RL21, as a don't care bit "x" (at S150).

For example, as shown in FIG. 16B, when the sub-word lines at a same order coupled to a plurality of main word lines are defective (see FIG. 9A), the fault management module 160 may make bits (e.g., fourth to eighth bits FADD<7:3>) designating the plurality of main word lines, among bits of the fault address FADD, as don't care bit "x" when storing the fault address FADD in the first row field RL11 (at S140). In addition, the fault management module 160 may make five LSBs of the repair address pre-stored in the corresponding second row field RL21, as a don't care bit "x" (at S150).

For example, as shown in FIG. 16C, when two sub-word lines at same orders coupled to two adjacent main word lines are defective (see FIG. 13A), the fault management module 160 may make a bit (e.g., a fourth bit (FADD<3>) designating two adjacent main word lines and a bit (e.g., a first bit (e.g., FADD<0>) designating two sub-word lines, as "don't care" bits, among bits of the fault address FADD, when storing the fault address FADD in the first row field RL11 (at S140). In addition, the fault management module 160 may make two LSBs of the repair address pre-stored in the corresponding second row field RL21, as don't care bits "x". That is, the fault address FADD stored in the first row field RL11 may be discretely masked, but the repair address stored in the second row field RL12 may be consecutively masked.

Accordingly, the first operation of storing the fault address FADD may be terminated as illustrated in FIG. 15.

Figure 17:
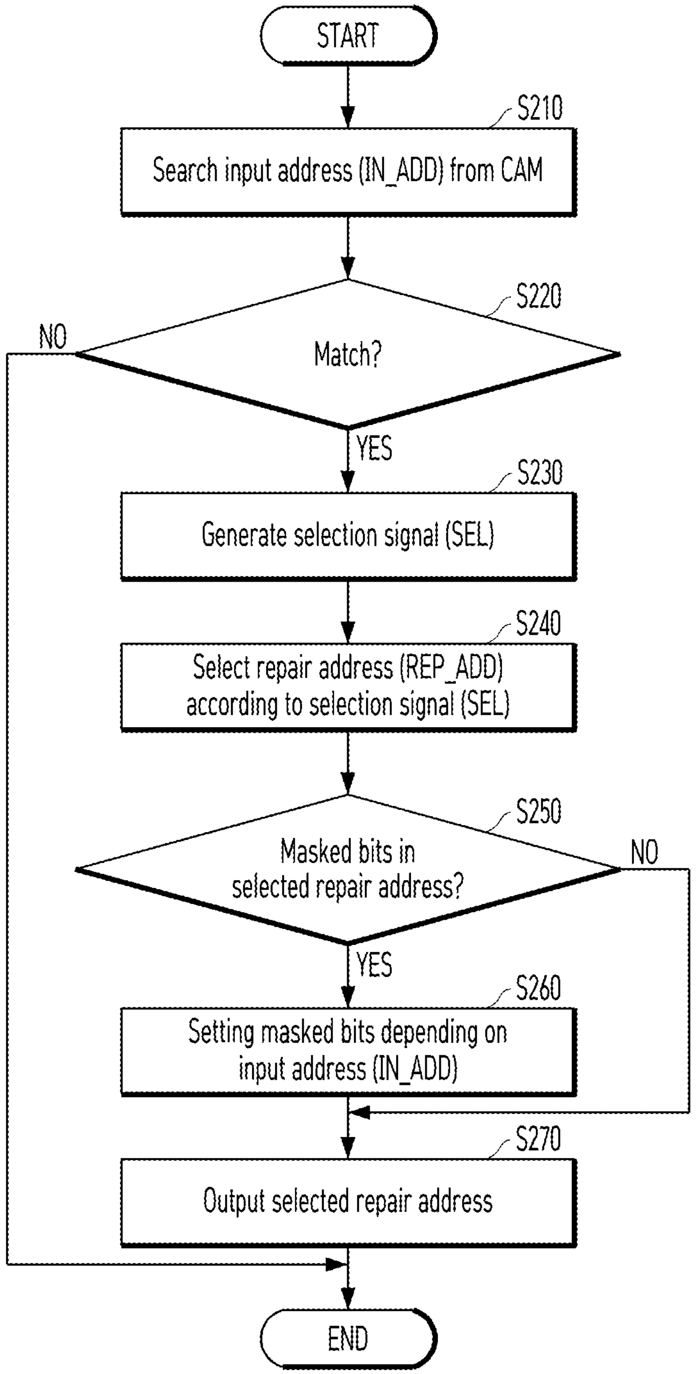
FIG. 17 is a flowchart illustrating a second operation of a fault management module according to an embodiment of the present disclosure.

FIG. 17 is a flowchart illustrating a second operation of a fault management module according to an embodiment of the present disclosure.

Referring to FIG. 17, an input address IN_ADD is input from a host 20.

When the input address IN_ADD is input from the host 20, a fault management module 160 may search for the input address IN_ADD from pre-stored fault addresses SF_ADD # in a first storage circuit 162 (at S210).

When the input address IN_ADD does not match all of the stored fault addresses SF_ADD # ("NO" in S220), the second operation may be terminated without an address remapping operation. In this case, the input address IN_ADD may be output as a target address OUT_ADD.

On the other hand, when the input address IN_ADD matches one of the stored fault addresses SF_ADD # ("YES" in S220), the fault management module 160 may activate a match line connected to the corresponding first row field and generate a selection signal SEL corresponding to the activated match line (at S230). The fault management module 160 may select a repair address pre-stored in the second row field according to the selection signal SEL (at S240).

When an LSB of the selected repair address is masked ("YES" in S250), the fault management module 160 may set masked bits of the selected repair address to high bits or low bits by using bits of the input address IN_ADD corresponding to the masked bits of the fault address FADD (at S260), and output the set repair address as the target address OUT_ADD (at S270). On the other hand, when the LSB of the selected repair address is not masked ("NO" in S250), the fault management module 160 may output the selected repair address as the target address OUT_ADD without setting the selected repair address (at S270).

Accordingly, the second operation of outputting the target address OUT_ADD to the memory device 200 may be terminated according to a result of comparing the input address IN_ADD provided from the host 20 with the stored fault addresses.

Figure 18A:
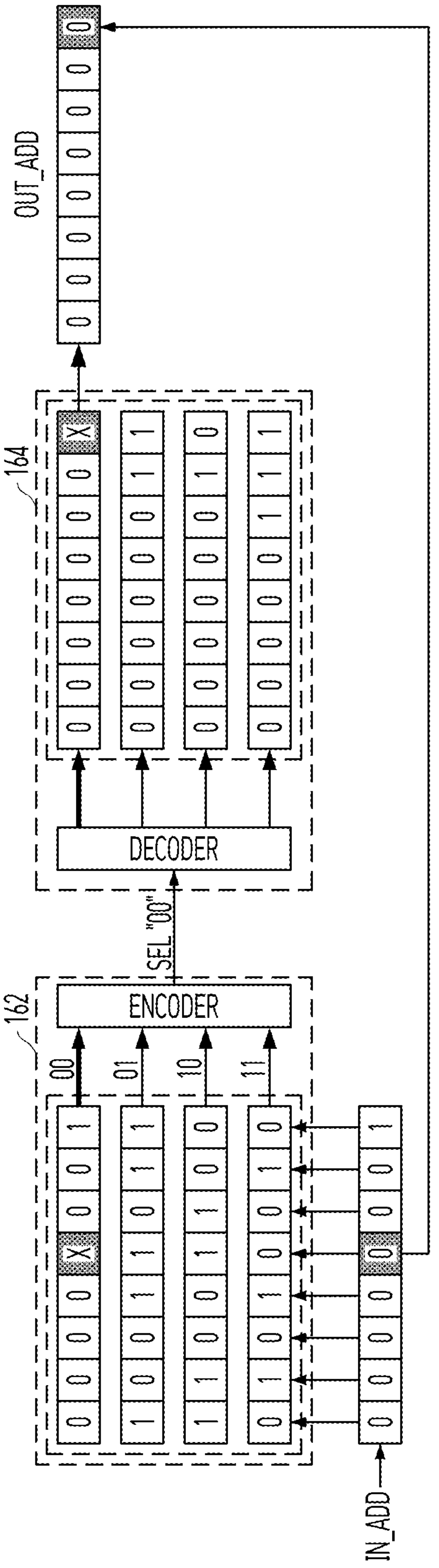
FIGS. 18A to 18D are diagrams illustrating examples of a second operation in reference to FIG. 17 according to embodiments of the disclosure.
Figure 18B:
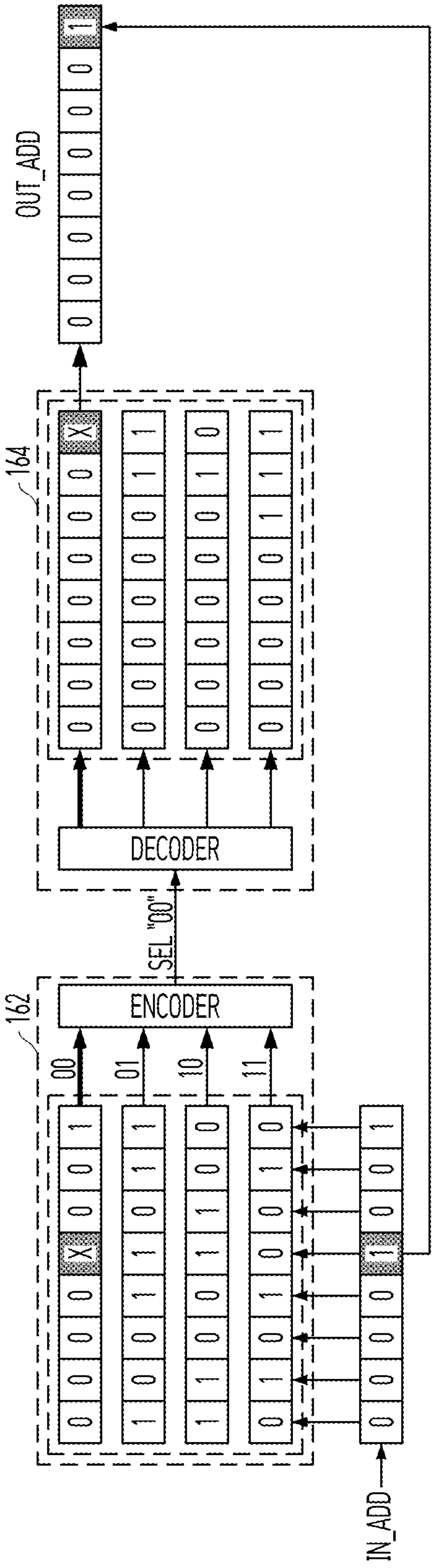
Figure 18C:
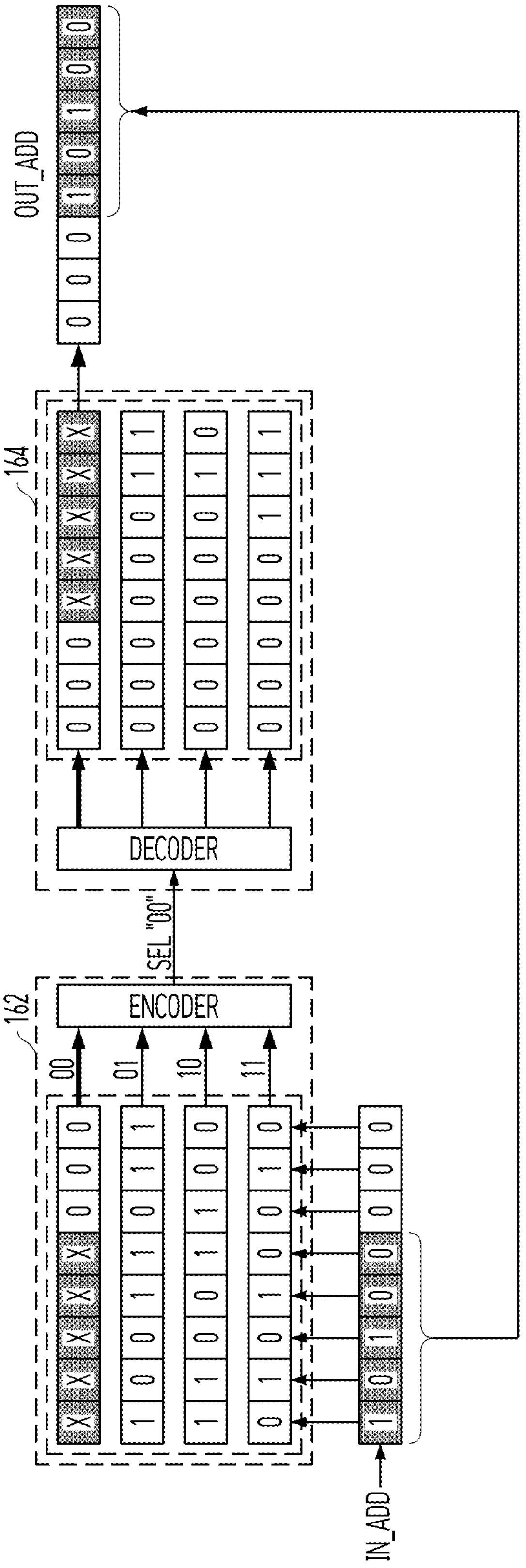

FIGS. 18A to 18D are diagrams illustrating examples of a second operation in reference to FIG. 17 according to embodiments of the disclosure. In FIGS. 18A to 18C, it is assumed that the four first row fields are disposed in a first storage circuit 162 and a value of a selection signal SEL from "00" to "11" is assigned to each row field.

Referring to FIG. 18A, an input address IN_ADD of "0000 0001" is input. The first storage circuit 162 may search for the input address IN_ADD in the first row fields. Since the fault address of "0000 X001", which is masked and stored by the first operation, is identical to the input address IN_ADD of "0000 0001", the first storage circuit 162 may generate a selection signal SEL of "00". A second storage circuit 164 may select a repair address of "0000 000X" stored in a second row field according to the selection signal SEL of "00". In this case, the second storage circuit 164 may output a target address OUT_ADD of "0000 0000" by setting a masked LSB of the selected repair address to a low bit depending on a fourth bit of the input address IN_ADD corresponding to the masked bit of the fault address.

Referring to FIG. 18B, an input address IN_ADD of "0000 1001" is input. Since the fault address of "0000 X001", which is masked and stored by the first operation, is identical to the input address IN_ADD of "0000 1001", the first storage circuit 162 may generate a selection signal SEL of "00". The second storage circuit 164 may select a repair address of "0000 000X" stored in the second row field according to the selection signal SEL of "00". In this case, the second storage circuit 164 may output a target address OUT_ADD of "0000 0001" by setting a masked LSB of the selected repair address to a high bit depending on a fourth bit of the input address IN_ADD corresponding to the masked bit of the fault address.

Referring to FIG. 18C, an input address IN_ADD of "1010 0000" is input. Since the fault address of "XXXX X000", which is masked and stored by the first operation, is identical to the input address IN_ADD of "1010 0000", the first storage circuit 162 may generate a selection signal SEL of "00". The second storage circuit 164 may select a repair address of "000X XXXX" stored in the second row field according to the selection signal SEL of "00". In this case, the second storage circuit 164 may output a target address OUT_ADD of "0001 0100" by setting masked LSBs of the selected repair address to "1 0100" depending on fourth to eighth bits of the input address IN_ADD corresponding to the masked bit of the fault address.

Figure 18D:
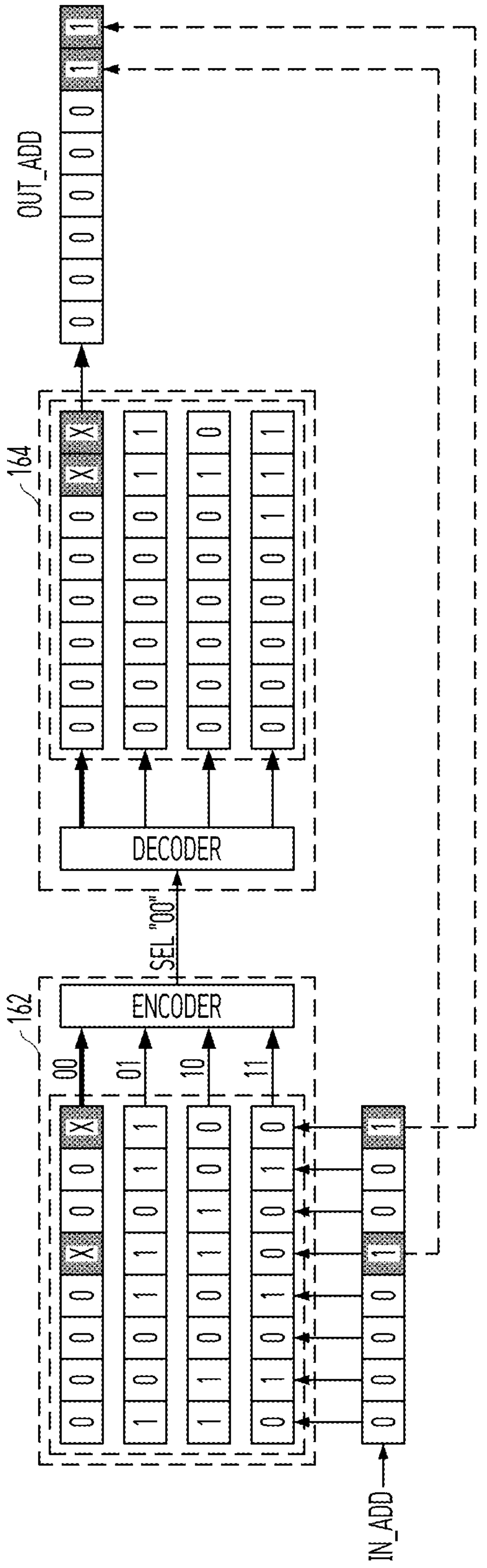

Referring to FIG. 18D, an input address IN_ADD of "0000 1001" is input. Since the fault address of "0000 X00X", which is masked and stored by the first operation, is identical to the input address IN_ADD of "0000 1001", the first storage circuit 162 may generate a selection signal SEL of "00". The second storage circuit 164 may select a repair address of "0000 00XX" stored in the second row field according to the selection signal SEL of "00". In this case, the second storage circuit 164 may output a target address OUT_ADD of "0000 0011" by setting masked LSBs of the selected repair address to "11" according to the first and fourth bits of the input address IN_ADD depending on first and fourth bits of the input address IN_ADD corresponding to the masked bit of the fault address.

As described above, a memory system according to an embodiment of the present disclosure may maximize limited CAM resources and minimize resource consumption by the memory controller through mapping the plurality of fault addresses to one CAM entry based on the multi-row fault information. In addition, the memory system according to an embodiment of the present disclosure may maximize the efficiency of fault management and improve performance by managing the plurality of fault addresses related to each other in the architecture of the memory device using one CAM entry.

Figure 19:
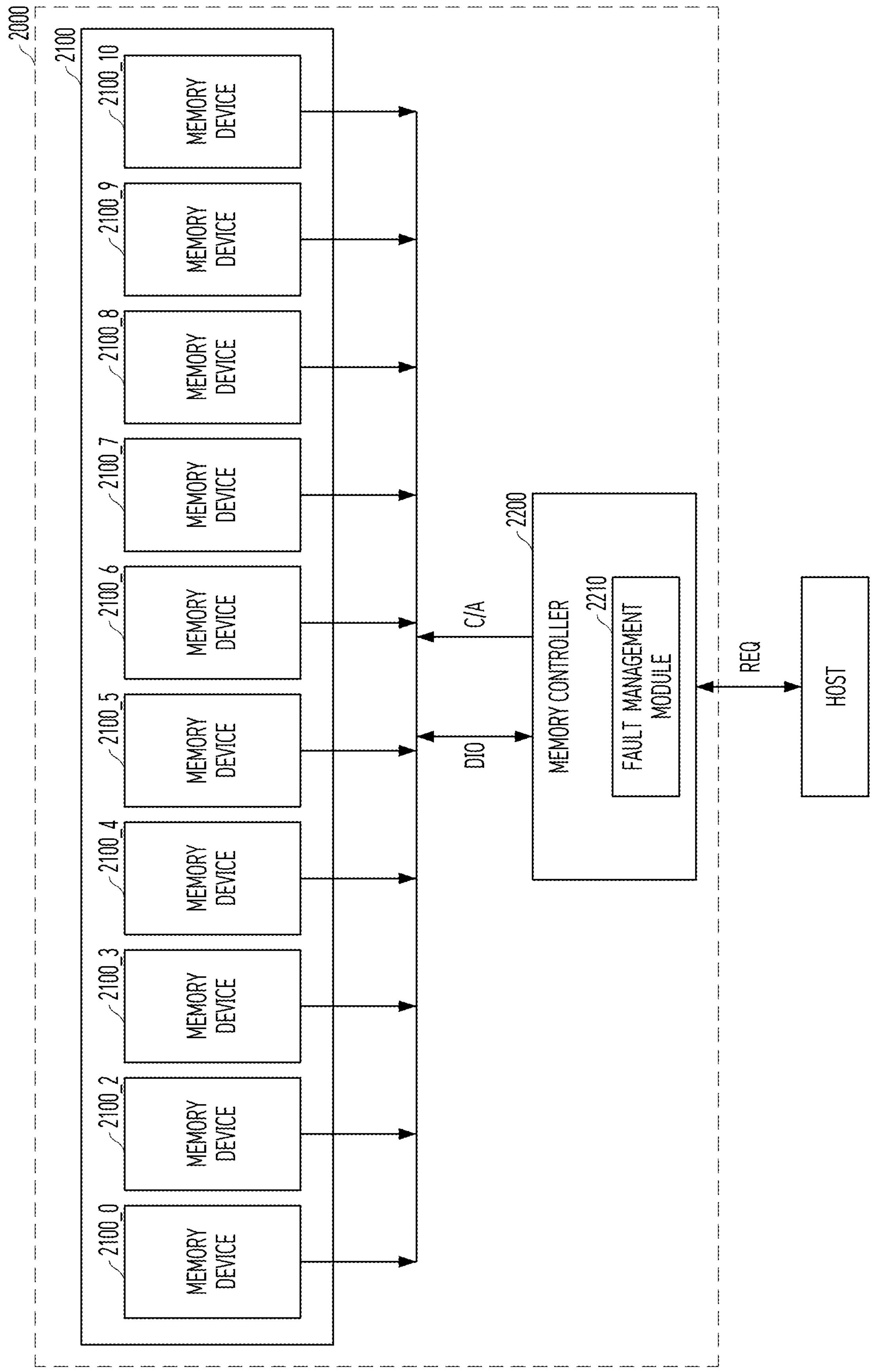
FIG. 19 is a block diagram of a memory system including a memory module according to an embodiment of the present disclosure.

FIG. 19 is a block diagram of a memory system including a memory module according to an embodiment of the present disclosure.

Referring to FIG. 19, a memory system 2000 may include a memory module 2100 and a memory controller 2200.

The memory controller 2200 may control the overall operation of the memory system 2000 and control the overall data exchange between a host and the memory module 2100. The memory controller 2200 may generate a command/address signal C/A in response to a request REQ from the host and provide the command/address signal C/A to the memory module 2100. The memory controller 2200 may provide data DIO corresponding to the request REQ provided from the host to the memory module 2100, and provide the data DIO read from the memory module 2100 to the host.

The memory module 2100 may include a plurality of memory devices 2100_0 to 2100_10. Each of the memory devices 2100_0 to 2100_10 may correspond to a memory device 200 described above with reference to FIG. 1.

Meanwhile, in an embodiment of the present disclosure, the memory controller 2200 may include a fault management module 2210. According to an embodiment, a fault analysis module may be additionally disposed inside or outside the memory controller 2200. The fault analysis module may analyze an error log generated based on the data DIO transmitted from the memory module 2100 to generate a fault address, and may generate a mode information signal when a specific fault mode is detected. The specific fault mode may be detected when a defect occurs in two or more sub-word lines among a plurality of sub-word lines disposed in each of the memory devices 2100_0 to 2100_10. The fault analysis module may provide a fault address and/or a mode information signal to the fault management module 2210.

The fault management module 2210 may store the fault address in a first storage circuit during a first operation, selectively mask one or more bits of the fault address according to the mode information signal, and mask one or more bits of a repair address corresponding to the masked fault address, among a plurality of repair addresses previously stored in a second storage circuit. In addition, the fault management module 2210 may output the selected repair address from the second storage circuit according to a result of comparing an input address with the fault addresses stored in the first storage circuit during the second operation. The fault management module 2210 may set the masked bits of the selected repair address using the input address corresponding to the masked bits of the fault address.

Figure 20:
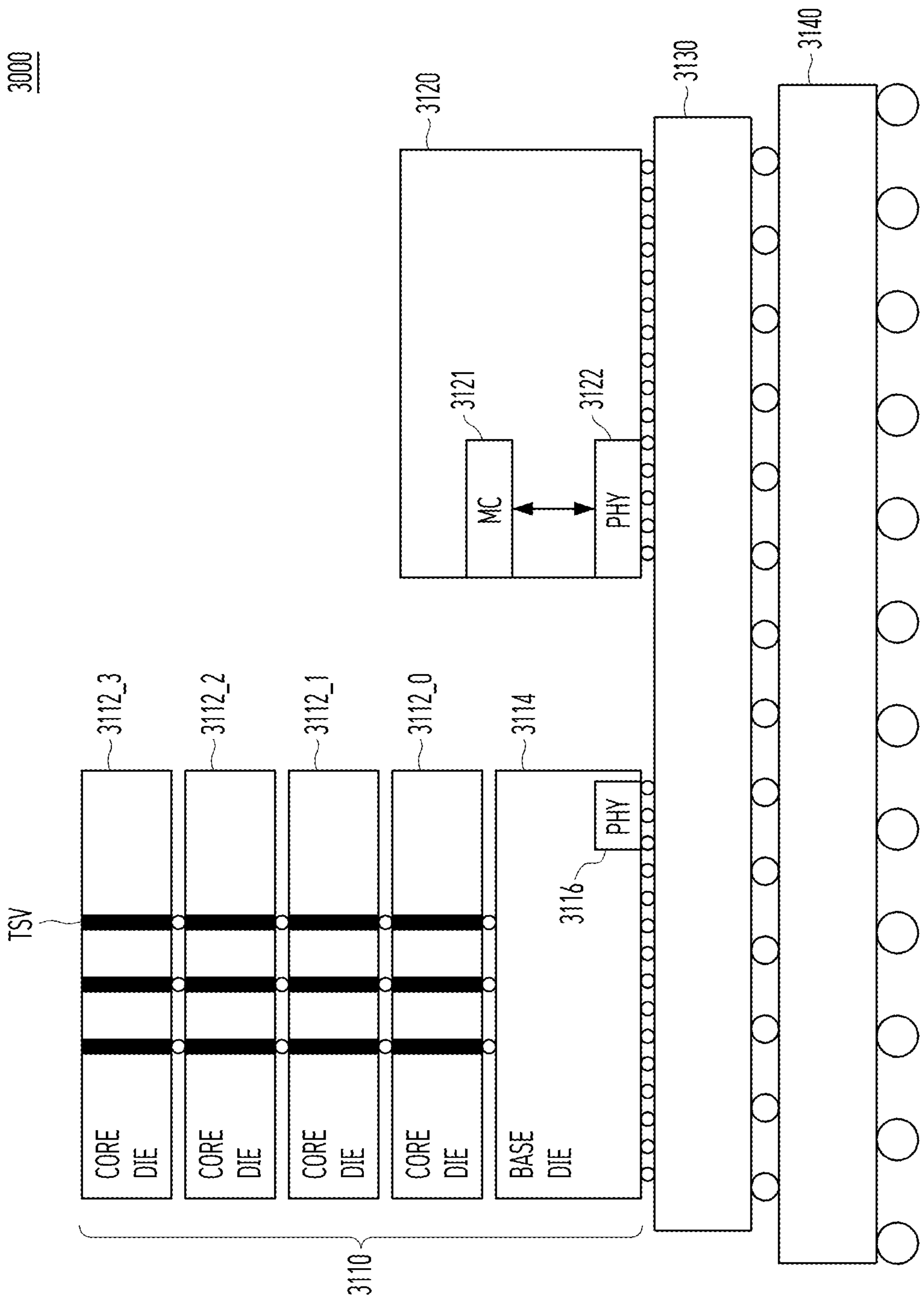
FIG. 20 is a diagram illustrating a memory system including a stacked memory device according to an embodiment of the present disclosure.

FIG. 20 is a diagram illustrating a memory system including a stacked memory device according to an embodiment of the present disclosure.

Referring to FIG. 20, a memory system 3000 may include a package board/substrate 3140, an interposer 3130, a stacked memory device 3110, and a processor 3120.

The package board/substrate 3140 may include a printed circuit board (PCB). The package board/substrate 3140 may be electrically connected to an external system board, main board, or module board through bumps.

The interposer 3130 may be formed over the package board/substrate 3140. The interposer 3130 may be a silicon substrate in which only wiring is formed.

The stacked memory device 3110 and the processor 3120 may be formed on the interposer 3130. The stacked memory device 3110 and the processor 3120 may be disposed on the interposer 3130 to be spaced apart from each other. Although one stacked memory device 3110 is illustrated in FIG. 20, the present disclosure is not limited thereto, and one or more stacked memory devices may be formed on the interposer 3130.

The processor 3120 may include a memory controller (MC) 3121 and a physical interface circuit (PHY) 3122. The memory controller 3121 may be configured to control the stacked memory device 3110. The physical interface circuit 3122 may interface between the memory controller 3121 and the stacked memory device 3110. The physical interface circuit 3122 may be an interface circuit that converts signals transferred from the memory controller 3121 into signals suitable for use in the stacked memory device 3110 and outputs the signals transferred from the stacked memory device 3110 into signals suitable for use in the memory controller 3121. The processor 3120 may be one of various processors such as a micro-processing unit (MPU), a central processing unit (CPU), a general processing unit (GPU), and a host processing unit (HPU).

The stacked memory device 3110 may include a lower chip 3114 and one or more upper chips 3112_0 to 3112_3 vertically stacked on the interposer 3130. An example of the stacked memory device 3110 formed by stacking a plurality of chips as described above may be a high bandwidth memory (HBM). Through electrodes TSV are formed between the lower chip 3114 and the upper chips 3112_0 to 3112_3, through which signals (i.e., commands, addresses, and data) may be transferred between the chips.

The lower chip 3114 may include a physical interface circuit (PHY) 3116 for an interface with the memory controller 3121. Each of the upper chips 3112_0 to 3112_3 may correspond to a memory device 200 described above with reference to FIG. 1.

In an embodiment of the present disclosure, the lower chip 3114 may include a fault management module. According to an embodiment, a fault analysis module may be additionally disposed inside or outside the lower chip 3114. The fault analysis module may analyze an error log generated based on data transmitted from the upper chips 3112_0 to 3112_3 to generate a fault address, and may generate a mode information signal when a specific fault mode is detected. In this case, the specific fault mode may be detected when a defect occurs in two or more sub-word lines among a plurality of sub-word lines disposed in each of the upper chips 3112_0 to 3112_3. The fault analysis module may provide a fault address and/or a mode information signal to the fault management module. When the fault analysis module is disposed outside the lower chip 3114, the fault management module may receive a fault address and/or a mode information signal through the physical interface circuit 3116. Depending on a configuration, the fault management module may receive a fault address and/or a mode information signal through a separate interface circuit.

The fault management module may store the fault address in a first storage circuit during a first operation, selectively mask one or more bits of the fault address according to the mode information signal, and mask one or more bits of a repair address corresponding to the masked fault address, among a plurality of repair addresses previously stored in a second storage circuit. In addition, the fault management module may output the selected repair address from the second storage circuit according to a result of comparing an input address with the fault addresses stored in the first storage circuit during the second operation. In this case, the fault management module may set the masked bits of the selected repair address using the input address corresponding to the masked bits of the fault address.

In some embodiments, the memory controller 3121 may include a fault management module. According to an embodiment, a fault analysis module may be additionally disposed inside or outside the memory controller 3121. The fault analysis module may analyze an error log generated based on data transmitted from the upper chips 3112_0 to 3112_3 to generate a fault address, and may generate a mode information signal when a specific fault mode is detected. The fault management module may store the fault address in a first storage circuit during a first operation, selectively mask one or more bits of the fault address according to the mode information signal, and mask one or more bits of a repair address corresponding to the masked fault address, among a plurality of repair addresses previously stored in a second storage circuit. In addition, the fault management module may output the selected repair address from the second storage circuit according to a result of comparing an input address with the fault addresses stored in the first storage circuit during the second operation. In this case, the fault management module may set the masked bits of the selected repair address using the input address corresponding to the masked bits of the fault address.

While the present disclosure has been described with respect to the specific embodiments, it will be apparent to those skilled in the art that various changes and modifications may be made without departing from the spirit and scope of the invention as defined in the following claims. Furthermore, the embodiments may be combined to form additional embodiments.

What is claimed is:

1. A fault management device, comprising:

a first storage circuit configured to receive and sequentially store a fault address of a memory device and to output a selection signal by comparing stored fault addresses with an input address;

a second storage circuit configured to store repair addresses corresponding to the stored fault addresses to output a selected repair address corresponding to the selection signal; and a mapping control circuit configured to control the first storage circuit to mask one or more bits of the received fault address according to a mode information signal indicating faults in two or more sub-word lines, among a plurality of sub-word lines arranged in the memory device, and to control the second storage circuit to mask one or more bits of a repair address corresponding to the masked bits of the received fault address.

2. The fault management device of claim 1, wherein the mapping control circuit is configured to:

control the first storage circuit to mask one or more bits related to the two or more sub-word lines, from among bits of the received fault address, according to the mode information signal.

3. The fault management device of claim 1, wherein the mapping control circuit is configured to:

control the second storage circuit to mask one or more least significant bits (LSBs) of the repair address according to the mode information signal.

4. The fault management device of claim 1, wherein the mapping control circuit is configured to:

set, when the selected repair address is output, masked bits of the selected repair address by using bits of the input address corresponding to the masked bits of the received fault address.

5. The fault management device of claim 1, wherein the memory device includes a plurality of cell blocks, wherein the mode information signal includes information on where faults occur in sub-word lines at a same order, coupled to two adjacent main word lines shared by adjacent cell blocks in a row direction, and wherein the mapping control circuit controls the first storage circuit to mask the one or more bits designating the two adjacent main word lines, among bits of the received fault address, according to the mode information signal.

6. The fault management device of claim 5, wherein the mapping control circuit is configured to:

set, when the selected repair address is output, masked bits of the selected repair address by using bits designating two adjacent main word lines, among bits of the input address.

7. The fault management device of claim 1, wherein the memory device includes a plurality of cell blocks, wherein the mode information signal includes information on where faults occur in sub-word lines at a same order, coupled to 2^k (k being an integer greater than or equal to 1) main word lines shared by cell blocks adjacent in a row direction, and wherein the mapping control circuit controls the first storage circuit to mask k bits designating the 2^k main word lines, among bits of the received fault address, according to the mode information signal.

8. The fault management device of claim 7, wherein the mapping control circuit is configured to:

set, when the selected repair address is output, masked bits of the selected repair address by using k bits designating the 2^k main word lines, among bits of the input address.

9. The fault management device of claim 1, wherein the memory device includes a plurality of cell blocks, wherein the mode information signal includes information on where faults occur in even-numbered or odd-numbered sub-word lines among sub-word lines shared by cell blocks adjacent to a row direction, and wherein the mapping control circuit controls the first storage circuit to mask remaining bits except for a least significant bit (LSB) of the received fault address, according to the mode information signal.

10. The fault management device of claim 9, wherein the mapping control circuit is configured to:

set, when the selected repair address is output, masked bits of the selected repair address by using remaining bits except for an LSB of the input address.

11. The fault management device of claim 1, wherein the memory device includes a plurality of cell blocks, wherein the mode information signal includes information on where faults occur in sub-word lines coupled to one main word line among a plurality of shared by cell blocks adjacent to a row direction, and wherein the mapping control circuit controls the first storage circuit to mask one or more bits designating the sub-word lines, among bits of the received fault address, according to the mode information signal.

12. The fault management device of claim 11, wherein the mapping control circuit is configured to:

set, when the selected repair address is output, masked bits of the selected repair address by using bits designating the sub-word lines, among bits of the input address.

13. The fault management device of claim 1, wherein the memory device includes a plurality of cell blocks, wherein the mode information signal includes information on where faults occur in two or more sub-word lines at the same order coupled to two adjacent main word lines, among a plurality of main word lines shared by cell blocks adjacent in a row direction, and wherein the mapping control circuit controls the first storage circuit to mask one or more bits designating the two adjacent main word lines and designating the two or more sub-word lines, among bits of the received fault address, according to the mode information signal.

14. The fault management device of claim 13, wherein the mapping control circuit is configured to:

set, when the selected repair address is output, masked bits of the selected repair address by using bits designating the two adjacent main word lines and designating the two or more sub-word lines, among bits of the input address.

15. A controller, comprising:

a fault analysis module configured to analyze an error log to generate a fault address and a mode information signal when a specific fault mode is detected; and a fault management module configured to:

during a first operation, store the fault address in a first storage circuit while masking one or more bits of the fault address, and mask one or more least significant bits (LSBs) of a repair address corresponding to the masked bits of the fault address, among a plurality of repair addresses pre-stored in a second storage circuit, according to the mode information signal, and during a second operation, output a selected repair address from the second storage circuit according to a result of comparing stored fault addresses in the first storage circuit with an input address.

16. The controller of claim 15, wherein the error log is generated based on data output from a memory device, wherein the fault analysis module generates the mode information signal by detecting faults in two or more sub-word lines among a plurality of sub-word lines arranged in the memory device.

17. The controller of claim 15, wherein the fault management module is configured to:

mask one or more bits related to two or more sub-word lines, among bits of the fault address, according to the mode information signal, during the first operation.

18. The controller of claim 15, wherein the fault management module is configured to:

set masked bits of the selected repair address by using bits of the input address corresponding to the masked bits of the fault address, during the second operation.

19. A fault management method, comprising:

storing a fault address of a memory device in a first storage circuit while masking one or more bits of the fault address, according to a mode information signal indicating faults in two or more sub-word lines among a plurality of sub-word lines arranged in the memory device;

masking one or more least significant bits (LSBs) of a repair address corresponding to the masked bits of the fault address, among a plurality of repair addresses pre-stored in a second storage circuit, according to the mode information signal;

searching for an input address from the first storage circuit; and outputting a selected repair address from the second storage circuit according to the search result.

20. The fault management method of claim 19, wherein the masking one or more bits of the fault address includes:

masking the one or more bits related to the two or more sub-word lines, among bits of the fault address, according to the mode information signal.

21. The fault management method of claim 19, further comprising:

setting, when the selected repair address is output, masked bits of the selected repair address by using bits of the input address corresponding to the masked bits of the fault address.

* * * * *